US011970321B2

(12) United States Patent
Farkas et al.

(10) Patent No.: US 11,970,321 B2
(45) Date of Patent: *Apr. 30, 2024

(54) RECYCLABLE FLEXIBLE FILMS AND BAGS FOR PACKAGING FLOWABLE MATERIALS

(71) Applicant: Liqui-Box Corporation, Richmond, VA (US)

(72) Inventors: Nicholas Farkas, Glenburnie (CA); Lamy Chopin, Missouri City, TX (US)

(73) Assignee: Liqui-Box Corporation, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/082,309

(22) Filed: Dec. 15, 2022

(65) Prior Publication Data

US 2023/0139304 A1 May 4, 2023

Related U.S. Application Data

(63) Continuation of application No. 17/204,414, filed on Mar. 17, 2021, now Pat. No. 11,603,242.
(Continued)

(51) Int. Cl.
*B65D 65/40* (2006.01)
*B32B 1/00* (2006.01)
(Continued)

(52) U.S. Cl.
CPC ............... *B65D 65/40* (2013.01); *B32B 1/00* (2013.01); *B32B 7/12* (2013.01); *B32B 27/08* (2013.01);
(Continued)

(58) Field of Classification Search
CPC .. B65D 65/40; B65D 75/322; B65D 75/5877; B32B 1/00; B32B 7/12; B32B 27/08;
(Continued)

(56) References Cited

U.S. PATENT DOCUMENTS 4,709,835 A 12/1987 Kruger
5,721,025 A 2/1998 Falla
(Continued)

OTHER PUBLICATIONS

PCT, Notification of Transmittal of the International Search Report and the Written Opinion of the International Searching Authority, or the Declaration, in Application No. PCT/US21/22735, dated May 27, 2021 (18 pages).
(Continued)

*Primary Examiner* — Michael C Miggins
(74) *Attorney, Agent, or Firm* — McAndrews, Held & Malloy, Ltd.

(57) ABSTRACT

The disclosure provides ethylene/α-olefin copolymer based co-extruded, multi-layer films, including barrier films and non-barrier films, and articles of manufacture that include the films, such as flexible bags and containers for flowable materials. The films and articles that include the films have improved flex-crak resistance and toughness. The films and articles that include the films have good barrier properties as the barrier films include a core layer of ethylene-vinyl alcohol (EVOH) copolymer having a high ethylene content. The low amount of EVOH copolymer in the total film that is needed to achieve the flex-crack resistance, toughness, and good barrier properties, further allow for the recycling of the films and articles of manufacture.

20 Claims, 4 Drawing Sheets

Related U.S. Application Data

(60) Provisional application No. 63/054,309, filed on Jul. 21, 2020, provisional application No. 62/990,540, filed on Mar. 17, 2020.

(51) Int. Cl.

| | | |
|---|---|---|
| *B32B 7/12* | (2006.01) | |
| *B32B 27/08* | (2006.01) | |
| *B32B 27/30* | (2006.01) | |
| *B32B 27/32* | (2006.01) | |
| *B65D 75/32* | (2006.01) | |
| *B65D 75/58* | (2006.01) | |

(52) U.S. Cl.
CPC .......... *B32B 27/306* (2013.01); *B32B 27/327* (2013.01); *B65D 75/322* (2013.01); *B65D 75/5877* (2013.01); *B32B 2250/05* (2013.01); *B32B 2270/00* (2013.01); *B32B 2307/72* (2013.01); *B32B 2439/46* (2013.01); *B32B 2439/70* (2013.01); *B65D 2565/385* (2013.01)

(58) Field of Classification Search
CPC . B32B 27/306; B32B 27/327; B32B 2250/05; B32B 2270/00; B32B 2307/72; B32B 2439/70; B32B 2565/385
See application file for complete search history.

(56) References Cited

U.S. PATENT DOCUMENTS

| | | |
|---|---|---|
| 2006/0286321 A1 | 12/2006 | Broadus |
| 2014/0311557 A1 | 10/2014 | Matsui et al. |
| 2018/0370201 A1 | 12/2018 | Farkas |
| 2019/0134938 A1 | 5/2019 | Farkas |
| 2019/0367219 A1 | 12/2019 | Bernal-Lara et al. |

OTHER PUBLICATIONS

ExxonMobil LLDPE LL 3003 Series. Datasheet [online]. ExxonMobil, Jun. 11, 2020 [retrieved on 1, 3. 13.27-28,39 May 14, 2021]. Retrieved from the Internet: <URL:https:llexxonmobilchemical. ulprospector.com/datasheet.aspx?l=58933&FMT=PDF&CULTURE= en-US&PS=PE&E=244016> p. 1, lns 5 and 15 (2 pages).

Extended European Search Report for Application No. EP21770490, dated Feb. 19, 2024, 7 pages.

RECYCLABLE FLEXIBLE FILMS AND BAGS FOR PACKAGING FLOWABLE MATERIALS

RELATED APPLICATIONS

This application is related to and claims priority from U.S. Provisional Patent Application No. 62/990,540, filed Mar. 17, 2020, and U.S. Provisional Patent Application No. 63/054,309, filed Jul. 21, 2020, and each of those disclosures are incorporated herein by reference in their entirety for all purposes.

FIELD

This disclosure relates to ethylene/α-olefin copolymer based co-extruded, multilayer (CEML) films that may be used in the manufacture of flexible bags (e.g., for holding, containing, shipping, packaging, and/or storing flowable materials). The CEML films may be used in the manufacture of, and provide for, flexible bags that can demonstrate improved flex-crack resistance, toughness, and have good barrier properties while also being recyclable. The described CEML films and flexible bags containing the films achieve these performance characteristics through combinations of materials that are not utilized in the state of the art (e.g., by including a barrier ethylene-vinyl alcohol (EVOH) copolymer core layer comprising a high % ethylene content (e.g., above 32%), where the barrier core layer comprises less than about 5% total film thickness or weight).

BACKGROUND

Bags used in the packaging flowable liquid products, such as food and beverage products are typically made using bag forming equipment, wherein rolls of film are unwound to form a bag. The bag is labeled with a code followed by punching to form a hole for the spout. The spout is inserted, the bag is sealed on the long sides, and is usually brushed to remove air. It is then cross-sealed at its bottom and at the top of the next bag being made and pulled through the line. The bag is perforated adjacent to the cross-seals and packaged for use on a bag-in-box filling line.

Customers demand bags having thinner films particularly when packaging flowable/liquid products. This represents a challenge as most commercially available films cannot meet these desired physical parameters while also providing inadequate seal strength and toughness. As a result bag performance has suffered particularly relating to bags that are filled with chilled products or products that must be refrigerated during use, storage, and shipment. Flexible bags on the scale of 1-6 gallons in size that are made from currently available films show significantly decreased performance, particularly when refrigeration is required. These bags can also suffer from inefficient emptying or evacuation of contents and can require the addition of devices that aid in complete evacuation of the flowable contents contained in the bag. Furthermore, fluctuating temperature environments can create further problems in handling, shipping and distribution of filled bags. Leakage is a systematic and recurring problem in such bags due to the frequency of tears and seal-breaks, primarily at side- and bottom-seals, and area around the spout of the bag.

Beverage bags are widely available based on an outer barrier ply of a thermal or adhesive laminate comprising a biaxially-oriented nylon 6 core, sandwiched by sealant layers of polyethylene/EVA. The inner ply of these beverage bags typically comprises polyethylene. Other bags for packaging a variety of liquids are based on a thermal or adhesive laminate comprising a biaxially-oriented PET with a vacuum-deposited metal coating to provide a high oxygen barrier construction. Nevertheless, these types of flexible bags that comprise biaxially-oriented nylon 6 or metallized-PET are not amenable to recycling, and therefore are not as desirable, sustainable, or environmentally-friendly as materials that can be recycled.

Accordingly, there is a need in the art to provide a multilayer film that provides for packaging (bags) that have excellent toughness and durability that can withstand lower temperatures and temperature changes that are common during used, shipping, and handling. Flexible bags that can empty bag contents (i.e., without any evacuation aid(s)) are also desirable in light of the savings such bags can realize (e.g., savings on materials and manufacturing costs). As demonstrated in the following disclosure, the inventors have developed film structures that can provide the required toughness and durability, essentially eliminating tears and breaks in seals in bags that are produced using the films. The films and bags comprising the films possess good barrier properties, good flex-crack resistance, and excellent self-evacuation properties, while also being recyclable, thus improving downstream sustainability.

SUMMARY

The present disclosure generally provides for co-extruded barrier films, bags comprising the co-extruded films, optionally in combination with one or more non-barrier films, packaged flowable products comprising the co-extruded barrier films and/or bags, and which comprise an amount of barrier material that provides good barrier performance, toughness, flex-crack resistance, and durability, while also being recyclable.

In an aspect, the disclosure relates to a co-extruded multi-layer polymeric barrier film comprising at least three layers: (i) an inner sealant layer comprising an ethylene/α-olefin copolymer fraction having a density in the range of 0.894 to 0.920 g/cm$^3$ in an amount of at least about 50% by weight or thickness of the total inner sealant layer, wherein the inner sealant layer has a total density in the range of 0.910 to 0.924 g/cm$^3$; (ii) a core barrier layer comprising ethylene-vinyl alcohol (EVOH) comprising about 0.1% to about 10% by total weight or thickness of the co-extruded multi-layer polymeric film, wherein the EVOH comprises at least 38% ethylene in the EVOH copolymer; and (iii) an outer sealant layer comprising an ethylene/α-olefin copolymer fraction having a density in the range of 0.894 to 0.920 g/cm$^3$ in an amount of at least about 50% by weight or thickness of the total outer sealant layer, wherein the outer sealant layer has a total density in the range of from about 0.910 to 0.924 g/cm$^3$.

In an aspect, the disclosure relates to a co-extruded multi-layer polymeric barrier film comprising at least three layers: (i) an inner sealant layer comprising an ethylene/α-olefin copolymer fraction having a density in the range of 0.894 to 0.920 g/cm$^3$ in an amount of at least about 50% by weight or thickness of the total inner sealant layer, wherein the inner sealant layer has a total density in the range of 0.910 to 0.924 g/cm$^3$; (ii) a core barrier layer comprising ethylene-vinyl alcohol (EVOH) comprising about 0.1% to about 5% by total weight or thickness of the co-extruded multi-layer polymeric film, wherein the EVOH comprises at least 38% ethylene in the EVOH copolymer; and (iii) an outer sealant layer comprising an ethylene/α-olefin copolymer fraction having a density in the range of 0.894 to 0.920 g/cm³ in an amount of at least about 50% by weight or thickness of the total outer sealant layer, wherein the outer sealant layer has a total density in the range of from about 0.910 to 0.924 g/cm³.

In another aspect, the disclosure relates to a co-extruded multi-layer polymeric film comprising five layers: (i) an inner sealant layer comprising an ethylene/α-olefin copolymer fraction having a density in the range of 0.894 to 0.920 g/cm³ in an amount of at least about 50% by weight or thickness of the total inner sealant layer, wherein the inner sealant layer has a total density in the range of from about 0.910 to 0.924 g/cm³; (ii) a first and a second interposed layer comprising an ethylene/α-olefin copolymer fraction having a density in the range of 0.894 to 0.920 g/cm³ in an amount of at least about 50% by weight or thickness of the first interposed layer, and an adhesive or tie resin in an amount effective to improve adhesion of the first and the second interposed layer to at least one other layers in the co-extruded multi-layer polymeric film, wherein the first and the second interposed layer has a total density in the range of from about 0.910 to 0.924 g/cm³; (iii) a core barrier layer comprising ethylene-vinyl alcohol (EVOH) comprising about 0.1% to about 10% by total weight or thickness of the co-extruded multi-layer polymeric film, wherein the EVOH comprises at least 38% ethylene in the EVOH copolymer; and (iv) an outer sealant layer comprising an ethylene/α-olefin copolymer fraction having a density in the range of 0.894 to 0.920 g/cm³ in an amount of at least about 50% by weight or thickness of the total outer sealant layer, wherein the outer sealant layer has a total density in the range of from about 0.910 to 0.924 g/cm³.

In another aspect, the disclosure relates to a co-extruded multi-layer polymeric film comprising five layers: (i) an inner sealant layer comprising an ethylene/α-olefin copolymer fraction having a density in the range of 0.894 to 0.920 g/cm³ in an amount of at least about 50% by weight or thickness of the total inner sealant layer, wherein the inner sealant layer has a total density in the range of from about 0.910 to 0.924 g/cm³; (ii) a first and a second interposed layer comprising an ethylene/α-olefin copolymer fraction having a density in the range of 0.894 to 0.920 g/cm³ in an amount of at least about 50% by weight or thickness of the first interposed layer, and an adhesive or tie resin in an amount effective to improve adhesion of the first and the second interposed layer to at least one other layers in the co-extruded multi-layer polymeric film, wherein the first and the second interposed layer has a total density in the range of from about 0.910 to 0.924 g/cm³; (iii) a core barrier layer comprising ethylene-vinyl alcohol (EVOH) comprising about 0.1% to about 5% by total weight or thickness of the co-extruded multi-layer polymeric film, wherein the EVOH comprises at least 38% ethylene in the EVOH copolymer; and (iv) an outer sealant layer comprising an ethylene/α-olefin copolymer fraction having a density in the range of 0.894 to 0.920 g/cm³ in an amount of at least about 50% by weight or thickness of the total outer sealant layer, wherein the outer sealant layer has a total density in the range of from about 0.910 to 0.924 g/cm³.

In another aspect, the disclosure relates to a co-extruded multi-layer polymeric film comprising seven layers: (i) an inner sealant layer comprising an ethylene/α-olefin copolymer fraction having a density in the range of 0.894 to 0.920 g/cm³ in an amount of at least about 50% by weight or thickness of the total inner sealant layer, wherein the inner sealant layer has a total density in the range of from about 0.910 to 0.924 g/cm³; (ii) a first and a second outer interposed layer, and a first and a second inner interposed layer, wherein all the interposed layers comprise an ethylene/α-olefin copolymer fraction having a density in the range of 0.894 to 0.920 g/cm³ in an amount of at least about 50% by weight or thickness of the first interposed layer, wherein all the interposed layers have a total density in the range of from about 0.910 to 0.924 g/cm³, and wherein the first and second inner interposed layers comprise an adhesive or tie resin in an amount effective to improve adhesion of the first and the second inner interposed layer to at least one layer in the co-extruded multi-layer polymeric film; (iii) a core barrier layer adjacent to and located between the first and the second inner interposed layers, the core barrier layer comprising ethylene-vinyl alcohol (EVOH) comprising about 0.1% to about 10% by total weight or thickness of the co-extruded multi-layer polymeric film, wherein the EVOH comprises at least 38% ethylene in the EVOH copolymer; and (iv) an outer sealant layer comprising an ethylene/α-olefin copolymer fraction having a density in the range of 0.894 to 0.920 g/cm³ in an amount of at least about 50% by weight or thickness of the total outer sealant layer, wherein the outer sealant layer has a total density in the range of from about 0.910 to 0.924 g/cm³.

In another aspect, the disclosure relates to a co-extruded multi-layer polymeric film comprising seven layers: (i) an inner sealant layer comprising an ethylene/α-olefin copolymer fraction having a density in the range of 0.894 to 0.920 g/cm³ in an amount of at least about 50% by weight or thickness of the total inner sealant layer, wherein the inner sealant layer has a total density in the range of from about 0.910 to 0.924 g/cm³; (ii) a first and a second outer interposed layer, and a first and a second inner interposed layer, wherein all the interposed layers comprise an ethylene/α-olefin copolymer fraction having a density in the range of 0.894 to 0.920 g/cm³ in an amount of at least about 50% by weight or thickness of the first interposed layer, wherein all the interposed layers have a total density in the range of from about 0.910 to 0.924 g/cm³, and wherein the first and second inner interposed layers comprise an adhesive or tie resin in an amount effective to improve adhesion of the first and the second inner interposed layer to at least one layer in the co-extruded multi-layer polymeric film; (iii) a core barrier layer adjacent to and located between the first and the second inner interposed layers, the core barrier layer comprising ethylene-vinyl alcohol (EVOH) comprising about 0.1% to about 5% by total weight or thickness of the co-extruded multi-layer polymeric film, wherein the EVOH comprises at least 38% ethylene in the EVOH copolymer; and (iv) an outer sealant layer comprising an ethylene/α-olefin copolymer fraction having a density in the range of 0.894 to 0.920 g/cm³ in an amount of at least about 50% by weight or thickness of the total outer sealant layer, wherein the outer sealant layer has a total density in the range of from about 0.910 to 0.924 g/cm³.

In embodiments of any of the above aspects, the co-extruded multi-layer polymeric film may comprise a structure wherein a first interposed layer is sandwiched between the inner sealant layer and the core barrier layer, and a second interposed layer is sandwiched between the outer sealant layer and the core barrier layer.

In some embodiments of the above aspect, the co-extruded multi-layer polymeric barrier film may comprise a inner sealant layer and/or an outer sealant layer comprises an adhesive or tie resin in an amount effective to improve adhesion of the sealant layers to the core barrier layer.

In some embodiments of any of the above aspects, the ethylene/α-olefin interpolymer in at least one of the inner sealant layer, the outer sealant layer, the first interposed layer, or the second interposed layer comprises a polymer fraction of linear low density polyethylene and a second copolymer fraction of an ethylene/octene-1 copolymer, an ethylene/hexene-1 copolymer, or an ethylene/butene-1 copolymer.

In some embodiments of any of the above aspects, the interpolymer has a density of 0.915 g/cm$^3$ and a melt index of 0.80-1.0 dg/min. In yet further embodiments, the ethylene/α-olefin interpolymer comprises at least one metallocene linear low density polyethylene (mLLDPE) having a density of 0.912 g/cm$^3$.

In some embodiments of any of the above aspects, the percent thickness of the barrier layer EVOH layer relative to the entire film is selected from the following numbers: 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, and 5.0. In some embodiments, the percent thickness of the barrier layer EVOH layer relative to the entire film may fall within a range of about 2.5% to about 5.0% (e.g., from 2.5-5.0, 2.6-5.0, 2.7-5.0, 2.8-5.0, 2.9-5.0, 3.0-5.0, 3.1-5.0, 3.2-5.0, 3.3-5.0, 3.4-5.0, 3.5-5.0, 3.6-5.0, 3.7-5.0, 3.8-3.9-5.0, 4.0-5.0, 4.1-5.0, 4.2-5.0, 4.3-5.0, 4.4-5.0, 4.5-5.0, 4.6-5.0, 4.7-5.0, 4.8-5.0, or 4.9-5.0%), and including any individual values and ranges falling within those recited ranges.

In some embodiments of any of the above aspects, the mole percent of ethylene in said EVOH copolymer is selected from a number that is greater than about 35 mol %. In yet further embodiments, the mole percent of ethylene in said EVOH copolymer is selected from 38, 39, 40, 41, 42, 43, 44, 45, 46, 47, 48, 49, 50, 51, 52, 53, 54, and 55 mol %.

In some embodiments of any of the above aspects, the ethylene/α-olefin interpolymer in at least one of the inner sealant layer, the outer sealant layer, the first interposed layer, or the second interposed layer has a melt index in the range of 0.2 to 2.0 dg/min.

In some embodiments of any of the above aspects, the ethylene/α-olefin interpolymer in at least one of the inner sealant layer, the outer sealant layer, the first interposed layer, or the second interposed layer has a zero shear viscosity ratio (ZSVR) in the range of 1.15 to 2.5.

In some embodiments of any of the above aspects, the ethylene/α-olefin interpolymer in at least one of the inner sealant layer, the outer sealant layer, the first interposed layer, or the second interposed layer has a molecular weight distribution, expressed as the ratio of the weight average molecular weight to number average molecular weight (Mw/Mn) in the range of 2.0-4.0.

In embodiments of some of the above aspects comprising an interposed layer, the first interposed layer is sandwiched between the inner sealant layer and the core barrier layer, and the second interposed layer is sandwiched between the outer sealant layer and the core barrier layer.

In some embodiments of any of the above aspects, any one or more of the sealant layers, core layers, and interposed layers, individually, may comprise from one and up to and including 45 layers of material.

In an aspect, the disclosure provides a bag for packaging flowable materials comprising a recyclable barrier co-extruded multi-layer polymeric film and a non-barrier co-extruded multi-layer polymeric film, wherein the barrier co-extruded multi-layer polymeric film comprises (i) an inner sealant layer comprising an ethylene/α-olefin copolymer fraction having a density in the range of 0.894 to 0.920 g/cm$^3$ in an amount of at least about 50% by weight or thickness of the total inner sealant layer, wherein the inner sealant layer has a total density in the range of from about 0.910 to 0.924 g/cm$^3$; (ii) a first and a second interposed layer comprising an ethylene/α-olefin copolymer fraction having a density in the range of 0.894 to 0.920 g/cm$^3$ in an amount of at least about 50% by weight or thickness of the first interposed layer, and an adhesive or tie resin in an amount effective to improve adhesion of the first and the second interposed layer to at least one other layers in the co-extruded multi-layer polymeric film, wherein the first and the second interposed layer has a total density in the range of from about 0.910 to 0.924 g/cm$^3$; (iii) a core barrier layer comprising ethylene-vinyl alcohol (EVOH) comprising about to about 5% by total weight or thickness of the co-extruded multi-layer polymeric film, or of the combined weight or thickness of the barrier and non-barrier films, wherein the EVOH comprises at least 38% ethylene in the EVOH copolymer; and (iv) an outer sealant layer comprising an ethylene/α-olefin copolymer fraction having a density in the range of 0.894 to g/cm$^3$ in an amount of at least about 50% by weight or thickness of the total outer sealant layer, wherein the outer sealant layer has a total density in the range of from about 0.910 to 0.924 g/cm$^3$.

In some embodiments of the above aspect, the bag may comprise a first and a second outer interposed layer, and a first and a second inner interposed layer, wherein all the interposed layers comprise an ethylene/α-olefin copolymer fraction having a density in the range of 0.894 to 0.920 g/cm$^3$ in an amount of at least about 50% by weight or thickness of the first interposed layer, wherein all the interposed layers have a total density in the range of from about to 0.924 g/cm$^3$, and wherein the first and second inner interposed layers comprise an adhesive or tie resin in an amount effective to improve adhesion of the first and the second inner interposed layer to at least one layer in the co-extruded multi-layer polymeric film; and wherein the core barrier layer is adjacent to and located between the first and the second inner interposed layers.

In some aspects, the disclosure provides a packaged product comprising the co-extruded multi-layer polymeric barrier films described herein.

In some aspects, the disclosure provides a packaged product comprising the bags for packaging flowable materials described herein.

In some aspects, the disclosure provides a method for manufacturing the co-extruded multi-layer polymeric barrier films described herein.

In some aspects, the disclosure provides a method for manufacturing the bags for packaging flowable materials described herein.

In some aspects, the disclosure provides a method for packaging a flowable product comprising the co-extruded multi-layer polymeric barrier films described herein.

In some aspects, the disclosure provides a method for packaging a flowable product comprising the bags described herein.

Additional aspects and embodiments of the disclosure will be apparent to one of ordinary skill in the art in view of the following description and illustrative examples.

BRIEF DESCRIPTION OF THE DRAWINGS

FIG. 1A depicts an example embodiment of a three layer non-barrier film. FIG. 1B depicts a five layer non-barrier film. FIG. 1C depicts a seven layer non-barrier film.

FIG. 1D depicts a seven layer non-barrier film, wherein four of the seven layers comprise a plurality of individual stacked layers of the same material to form the entire layer.

FIG. 2A depicts an example embodiment of a three layer barrier film, wherein the interior layer comprises the barrier layer. FIG. 2B depicts a five layer barrier film, wherein the interior layer comprises the barrier layer. FIG. 2C depicts a seven layer barrier film, wherein the interior layer comprises the barrier layer. FIG. 2D depicts a seven layer barrier film, wherein five of the seven layers—including the interior barrier layer—comprise a plurality of individual stacked layers of the same material to form the entire layer.

FIG. 3A depicts an example embodiment of a 2-ply film structure that includes the three layer non-barrier and barrier films depicted in FIGS. 1A and 2A, respectively, wherein the "outer" ply comprises the barrier layer, and the "inner" ply comprises the non-barrier layer. In each of the embodiments depicted in FIGS. 3A-3D, the outer and inner plies are not joined together except at the edges (seals) to form the bags. Within the majority of the surface area between the plies, the plies may be considered "free floating" with respect to each other. FIG. 3B depicts an example embodiment of a 2-ply film structure that includes the five layer non-barrier and barrier films depicted in FIGS. 1B and 2B, respectively, wherein the "outer" ply comprises the barrier layer, and the "inner" ply comprises the non-barrier layer. FIG. 3C depicts an example embodiment of a 2-ply film structure that includes the five layer non-barrier and seven layer barrier films depicted in FIGS. 1B and 2C, respectively, wherein the "outer" ply comprises the barrier layer, and the "inner" ply comprises the non-barrier layer. FIG. 3D depicts an example embodiment of a 2-ply film structure that includes the seven layer non-barrier and barrier films depicted in FIGS. 1D and 2D, respectively, wherein five of the seven layers (including the internal barrier layer) of the "outer" barrier ply, and four of the seven layers of the "inner" non-barrier layer comprise a plurality of individual stacked layers of the same material to form the entire layer.

DETAILED DESCRIPTION

Figure 1B:
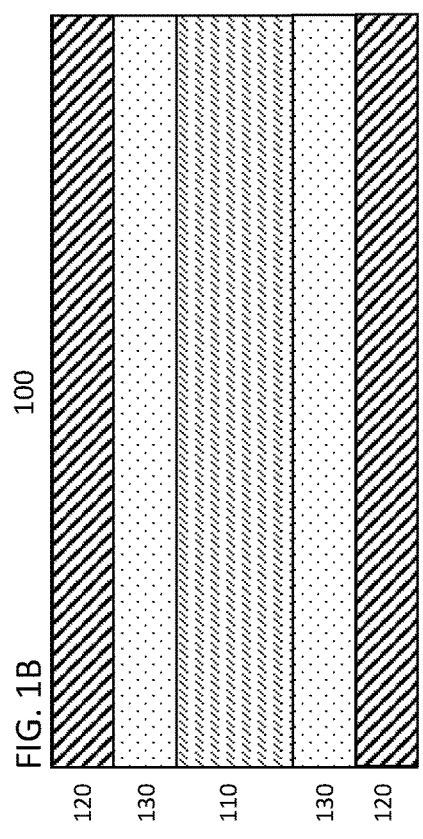
FIGS. 1A-1D illustrate a series of general schematic depictions of multi-layer non-barrier films in accordance with several example aspects and embodiments described herein.

Before continuing with the further details regarding the disclosure, it is to be understood that this disclosure is not limited to specific materials (including polymers, copolymers, interpolymers, additives, and the like), structures and arrangements (including number of individual layers in a film, number of plys of film, orders of layers and plys of films, and the like), or process steps and intended or envisions applications and uses, as such may vary while still falling within the scope of the description provided herein.

The percentages recited in the disclosure typically refer to either percent weight or percent thickness of the total weight or total thickness of the composition, and are typically denoted when recited. While the differences in density of components (polymers, copolymers, with or without additives) may result in a difference between a percentage expressed by weight relative to a percentage expressed by thickness, the two percentage numbers are typically very close to each other. All ratios expressed in this patent application are on a weight:weight basis unless expressed otherwise.

Ranges are used as shorthand only to avoid listing and describing each and every value within the range. Any appropriate value within the range can be selected as the upper value, the lower value, or the end-point of the range.

The singular form of a word includes its plural, and vice versa, unless the context clearly dictates otherwise. Thus, references "a," "an," and "the" generally include the plurals of the respective terms they qualify. For example, reference to "a method" includes its plural-"methods." Similarly, the terms "comprise," "comprises," and "comprising," whether used as a transitional phrase in the claims or otherwise, should be interpreted inclusively rather than exclusively. Likewise, the terms "include," "including," "has," "having," and "or" should be construed to be inclusive, unless such a construction is clearly prohibited from the context. Similarly, the term "examples," particularly when followed by a listing of terms, is intended to be merely exemplary, illustrative, and non-limiting and thus should not be deemed to be exclusive or comprehensive.

Unless defined otherwise, all technical and scientific terms, terms of art, and acronyms used in the disclosure have the meanings commonly understood by one of ordinary skill in the art in the relevant technology field(s) in which the term is used. Although any compositions, methods, articles of manufacture, or other means or materials similar or equivalent to those described in the disclosure can be used in the practice of the various aspects and embodiments herein, specific compositions, methods, articles of manufacture, or other means or materials are described only for purposes of illustration and clarity.

All patents, patent applications, publications, technical and/or scholarly articles, and other references cited or referred to herein are incorporated in their entirety by reference to the extent allowed by law. The discussion of those references is intended merely to summarize the assertions made in these references. No admission is made that any such patents, patent applications, publications or references, or any portion thereof, are relevant, material, or prior art to the disclosure or the scope of claims.

As used herein, the term "flowable material" does not include gaseous materials powders or other solid materials, but encompasses any liquid materials which are flowable under gravity or may be pumped. Such materials include liquids (for example, syrup, mixes, alcohol, milk, water, fruit juice, oil, etc.), semi-solid and liquid emulsions (for example, ice cream, ice cream mix, soft margarine, whipping cream, doughs, etc.). The aspects and embodiments described herein find particular use for flowable foods and beverages, including those that may be packaged at ambient or at refrigerated temperatures.

As used herein "density" is determined by ASTM D 792 and "melt-index" by ASTM D 1238. The "melting point" of a polymer is measured as the peak melting point when performing differential scanning calorimetry (DSC) as described in ASTM Procedure D3417-83 (rev. 88).

Figure 1D:
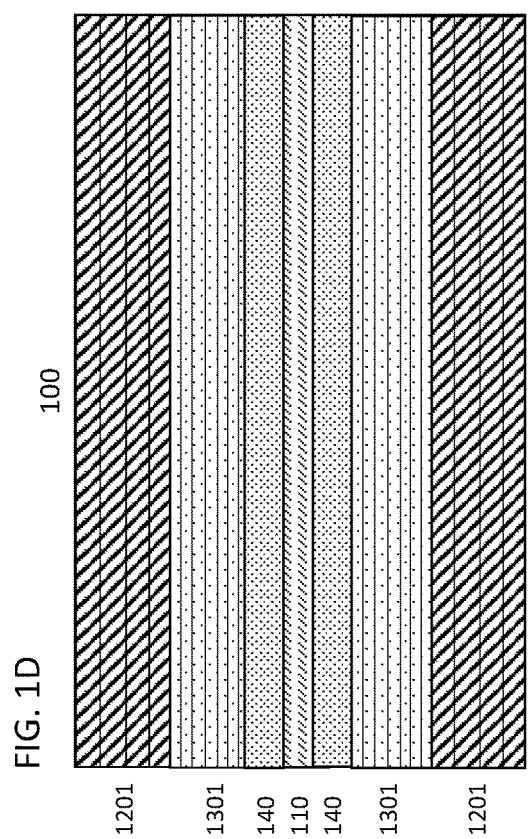
Figure 1A:
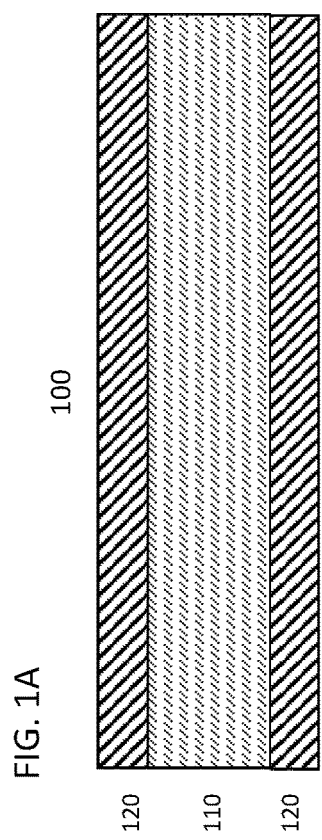
Figure 1C:
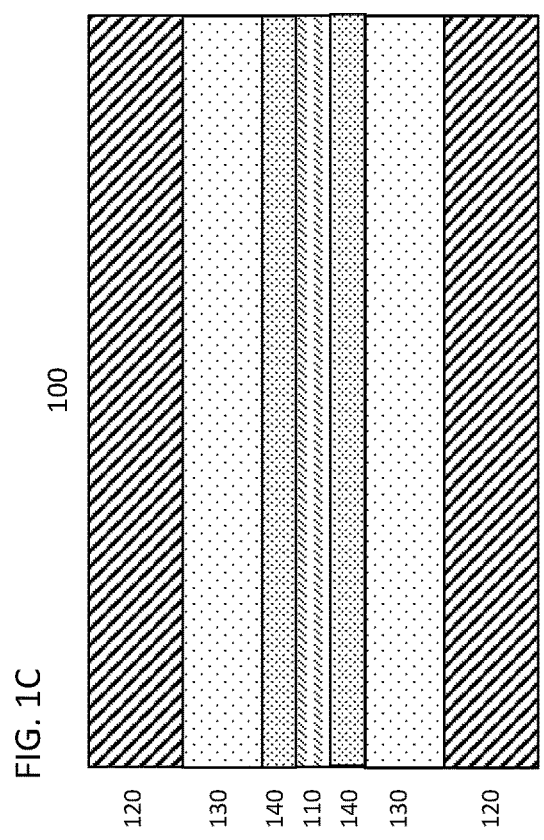

FIGS. 1A-D provide general schematic depictions of multi-layer non-barrier films (100) in accordance with example embodiments of the disclosure. As shown in FIG. 1A, coextruded non-barrier films in accordance with the disclosure typically comprise a plurality of layers, which may be the same or different. A core layer (110) and sealing layers (120) any of which may be the same or different polymer or copolymer material may be coextruded to form a non-barrier film (100). In some example embodiments, a non-barrier film may not include a core layer (i.e., only include two layers). FIG. 1B illustrates an example embodiment of a five layer non-barrier film (100) having a core layer (110), outer and inner sealant layers (120), and outer and inner interposed layers (130). FIG. 1C depicts an example embodiment in accordance with the disclosure of a seven layer non-barrier film (100), having a core layer (110), outer and inner sealant layers (120), first outer and inner interposed layers (130), and second outer and third inner interposed layers (140). FIG. 1D depicts a seven layer non-barrier film (100) that is similar to the example embodiment illustrated in FIG. 1C, and includes similar core layer (110) and second outer and inner interposed layers (140), but further illustrates an example embodiment wherein the outer and inner sealant layers (1201), and the first outer and inner interposed layers (1301) comprise a plurality of individual stacked layers of the same material to form the entire layer.

Figure 2A:
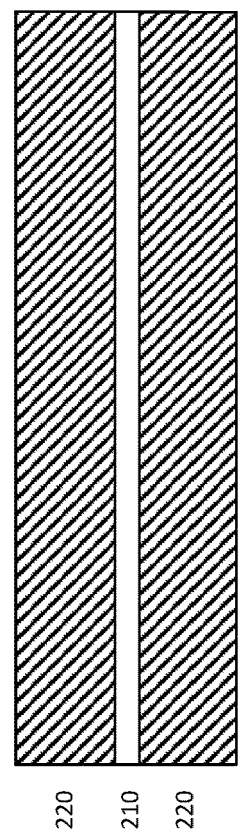
FIGS. 2A-2D illustrate a series of general schematic depictions of multi-layer barrier films in accordance with several example aspects and embodiments described herein.

FIGS. 2A-D provide general schematic depictions of multi-layer barrier films (200) in accordance with several example aspects and embodiments described herein. While the example illustrations and structures in FIGS. 2A-2D are similar to those described in FIGS. 1A-1D, the multi-layer barrier films and non-barrier films are not required to be similarly structured or symmetrical, as discussed in more detail herein. Further, the barrier films (200) illustrated in FIGS. 2A-2D and FIGS. 3A-3D, and in accordance with the disclosure, comprise a core barrier layer (210), (2101) of ethylene vinyl alcohol (EVOH). FIG. 2A provides an example embodiment of a three layer barrier film (200), having inner and outer sealing layers (220) which may be the same or different material, and a core barrier layer (210) that comprises the EVOH barrier material that may be coextruded to form the barrier film (200). Such embodiments suitably include an adhesive between the core barrier layer and the sealing layers, or the sealing layer may comprise an amount of a tie material to assist in binding between the layers.

Figure 2B:
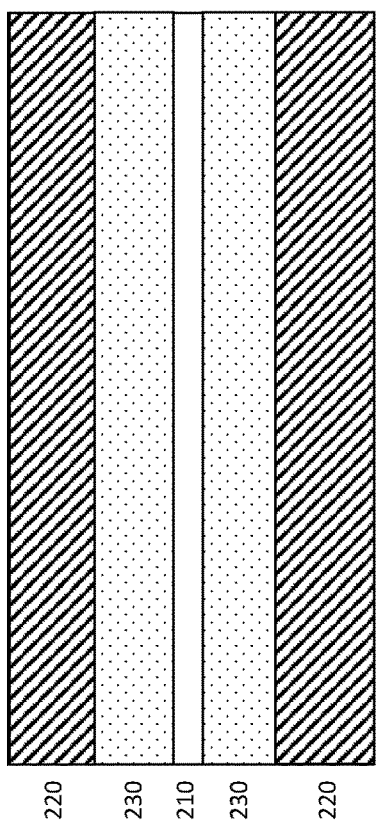

FIG. 2B illustrates an example embodiment of a five layer barrier film (200) having a core layer (210), outer and inner sealant layers (220), and first inner and outer interposed layers (230). Any of the outer sealant and inner sealant layers (220), and the interposed layers (230) may be constructed from the same polymer or copolymer material or may be constructed from different polymer or copolymer materials. Accordingly, in some example embodiments the polymer or copolymer used in the outer and inner sealant layers (220) may be different and may have a different thickness. In similar example embodiments the polymer or copolymer used in the inner and outer interposed layers (230) may be different and may have a different thickness. In some further example embodiments, the polymer or copolymer used in all the outer and inner sealant layers (220) and the inner and outer interposed layers (230) may be the same material and have about the same thickness.

Figure 2C:
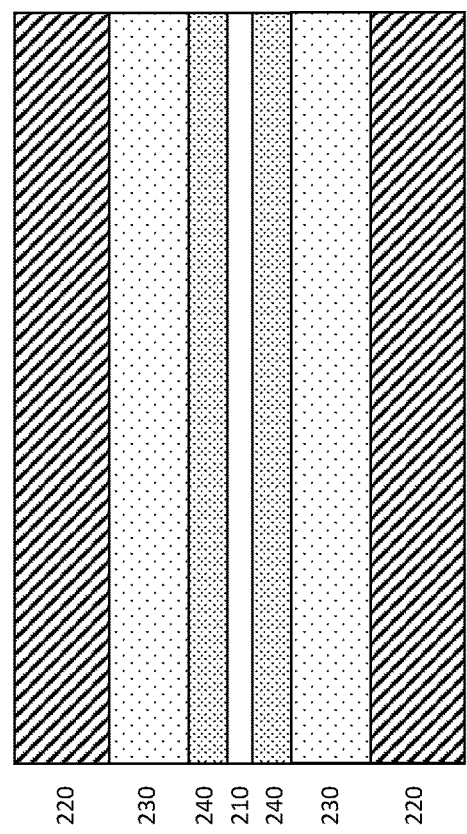

FIG. 2C illustrates an example embodiment of a seven layer barrier film (200) having a core layer (210), outer and inner sealant layers (220), first outer and inner interposed layers (230) and second outer and inner interposed layers (240). Any of the outer and inner sealant layers (220), the first and second interposed layers (230), (240) may be constructed from the same polymer or copolymer material or may be constructed from different polymer or copolymer materials. Accordingly, in some example embodiments the polymer or copolymer used in either the sealant layers (220) may be different and may have a different thickness. In similar example embodiments the polymer or copolymer used in the first and second interposed layers (230), (240) may be different and may have a different thickness. In some further example embodiments, the polymer or copolymer used in all the outer and inner sealant layers (220) and first and second interposed layers (230), (240) may be the same material and have about the same thickness.

Figure 2D:
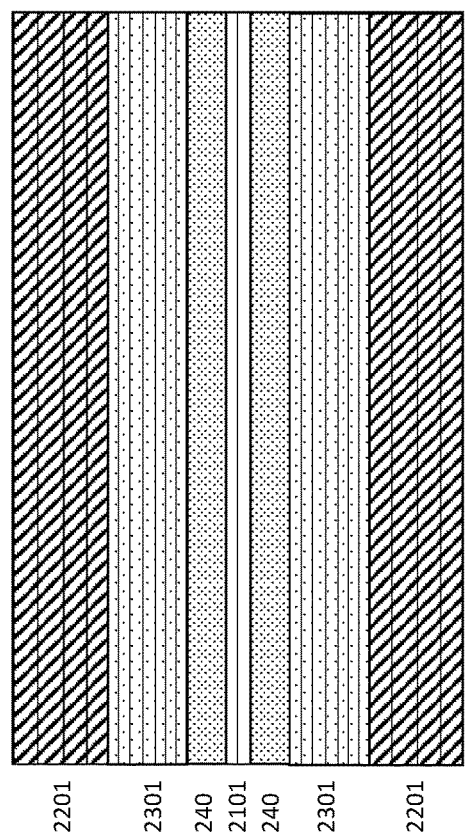

FIG. 2D illustrates an example embodiment of a seven layer barrier film (200) having a general structure similar to the embodiment described in FIG. 2C, wherein five of the seven layers, including the interior core barrier layer (2101), the outer and inner sealant layers (2201), and the first outer and inner interposed layers (2301) comprise a plurality of individual stacked layers of the same material to form the entire layer.

While not necessarily to scale, as illustrated in any of FIGS. 2A-2D or FIGS. 3A-3D and as described in the various aspects and embodiments herein, of the disclosure provides for films comprising a core barrier layer of EVOH that constitutes 5% or less of the total film (by weight or thickness).

Figure 3B:
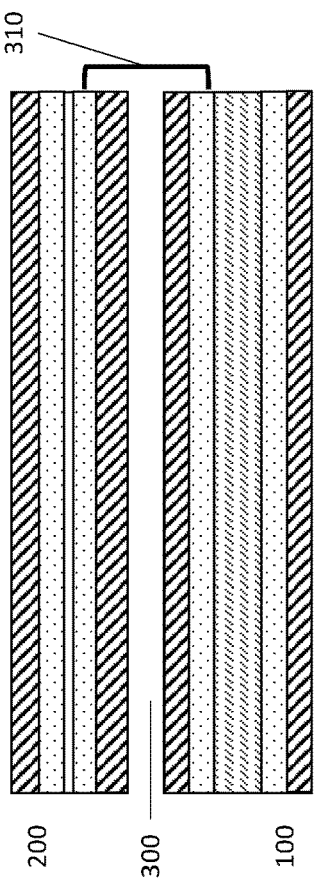
FIGS. 3A-3D illustrate a series of general schematic depictions of a 2-ply film structure that includes the multi-layer barrier and non-barrier films in accordance with several example aspects and embodiments described herein.
Figure 3D:
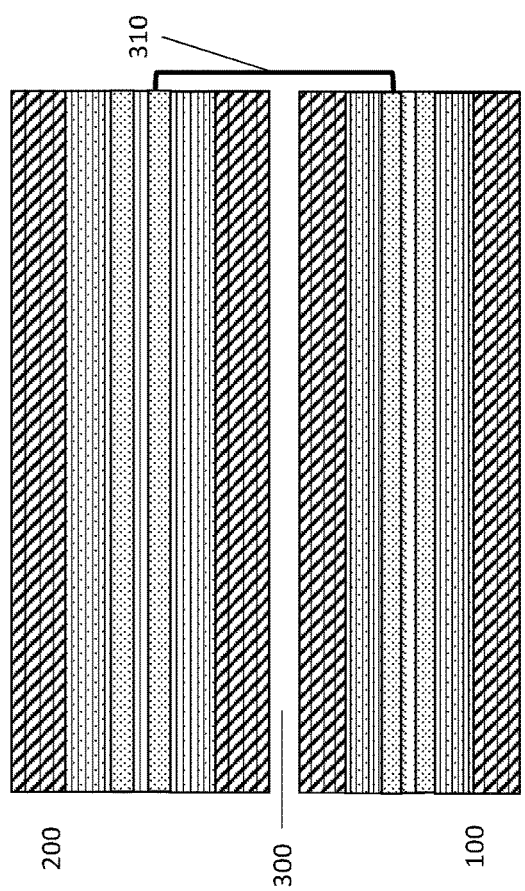
Figure 3A:
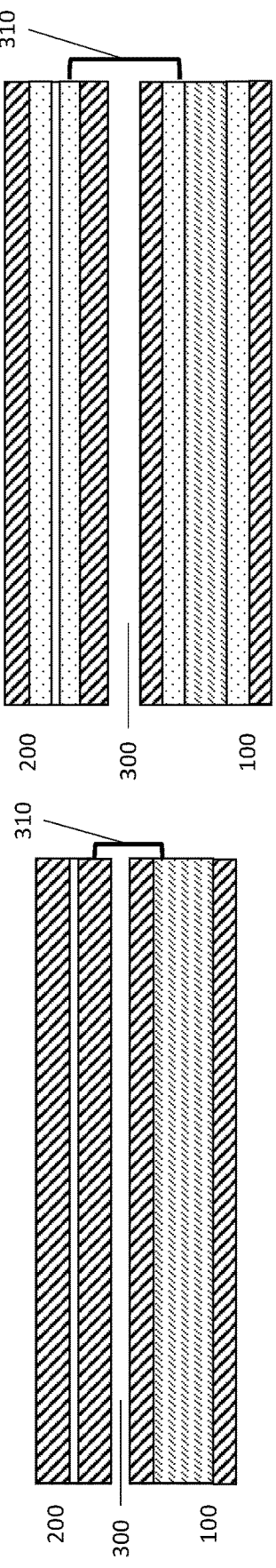
Figure 3C:
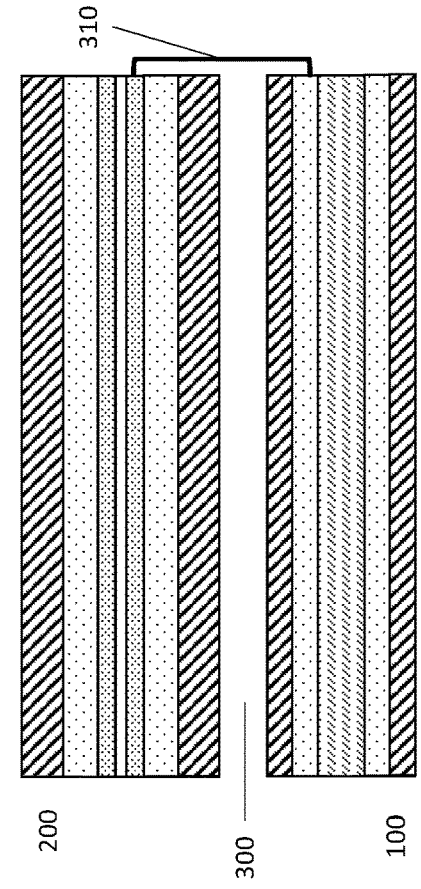

FIGS. 3A-3D illustrate a series of example embodiments in accordance with the disclosure of 2-ply film structures that can include the multi-layer barrier and non-barrier films described in the various aspects and embodiments herein. FIG. 3A shows an example embodiment of a 2-ply film structure that includes the three layer non-barrier (100) and barrier (200) films depicted in FIGS. 1A and 2A, respectively, wherein the "outer" ply comprises the barrier layer (200), and the "inner" ply comprises the non-barrier layer (100). The ply layers in all the depicted embodiments of FIGS. 3A-3D are physically joined only at the edges (represented by (310)), and can, thus include a gap or separation between the two plies (300) at locations other than at the sealed edges (310). FIG. 3B shows an example embodiment of a 2-ply film structure that includes the five layer non-barrier (100) and barrier (200) films depicted in FIGS. 1B and 2B, respectively, wherein the "outer" ply comprises the barrier layer (200), and the "inner" ply comprises the non-barrier layer (100). FIG. 3C shows an example embodiment of a 2-ply film structure that includes the five layer non-barrier (100) and seven layer barrier (200) films depicted in FIGS. 1C and 2D, respectively, wherein the "outer" ply comprises the barrier layer (200), and the "inner" ply comprises the non-barrier layer (100). FIG. 3D shows an example embodiment of a 2-ply film structure that includes the seven layer non-barrier (100) and barrier (200) films depicted in FIGS. 1D and 2D, respectively, wherein five of the seven layers of the "outer" barrier layer (200), and four of the seven layers of the "inner" non-barrier layer (100) comprise a plurality of individual stacked layers of the same material to form the entire layer. As discussed herein, the different plys do not need to have the same or similar number of layers or layer structures in order to fall within the scope of the disclosure.

Co-Extruded Films

In a general aspect, the disclosure relates to co-extruded (i) non-barrier films and (ii) barrier films that may be combined in any number of ways and combinations to form multi-layer and multi-ply structures that find use in a wide variety of applications.

Materials and Film Structures for Non-Barrier and Barrier Films

In some aspects, the disclosure provides co-extruded multi-layer (CEML) films usable for bags for packaging liquid flowable materials including, for example, products related to foods and beverages. In example embodiments of this aspect, the disclosure provides a CEML film that is lower in gauge (thickness) but exhibits superior toughness and seal strength, including under variable temperature conditions (e.g., ambient and refrigerated conditions) as exemplified by data presented herein showing higher bag drop heights (F50 values) as measured by the Bruceton stair-drop test method.

In some embodiments, the disclosure provides a non-barrier CEML (NB-CEML) film that excludes (i.e., does not comprise, contain, or consist of) a material that provides a barrier layer (e.g., non-barrier embodiments do not include EVOH in any of its layers). In some embodiments, the NB-CEML may comprise interpolymers and film structures as described in published US Patent Application no. 2018/0370201 ("Bag-in-Box Film for Packaging Refrigerated Liquids") published Dec. 27, 2018, and which is incorporated herein by reference in its entirety. Thus, aspects and embodiments of the disclosure provide for a flexible bag or a bag-in-box packaging that comprises (i) a barrier coextruded multilayer film as described herein, and (ii) a non-barrier coextruded multilayer film as described herein and/or as described, for example, in US PGPUB 2018/0370201, wherein the barrier and non-barrier films are combined and edge-sealed as separate plys in the flexible bag or bag-in-box structure.

In some embodiments, the disclosure provides a barrier CEML (B-CEML) film that comprises a core barrier layer comprising EVOH.

Generally, the embodiments relating to the non-barrier (NB-CEML) and barrier (B-CEML) film structures may comprise similar or the same components, materials, thickness and structure, with the exception of the presence of the EVOH core layer in the barrier film (B-CEML). Accordingly, in example embodiments either or both of the barrier and non-barrier films can comprise a co-extruded structure that may be symmetrical or asymmetrical. In some embodiments, the film structures can comprise an outer sealant layer, one or more interposed layers, a core-layer, one or more interposed layers, and an inner sealant-layer.

In some embodiments relating to the B-CEML, the film may comprise one or more interposed layers between other interposed layers or an inner and/or an outer sealant layer, and the core barrier layer. That is, in some embodiments, a B-CEML comprises a first, or a first and a second, or a first, second, and a third (etc.) inner and/or outer interposed layer positioned between the core barrier layer and the sealant layers. In embodiments comprising more than one interposed layer, at least one side of an interposed layer will abut/be adjacent to another interposed layer.

In example embodiments, the co-extruded, multi-layer films may comprise from 1 to about 45 or 50 individual polymer film layers. Stated another way, either the B-CEML film, the NB-CEML film, or both may comprise one or more polymer layers that are formed from multiple single layers of the same polymer and may be selected from: 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, and 50. In some embodiments, the films may comprise a number of layers from a range defined by any two numbers given above, which includes the end-points of the range.

For example, B-CEML and NB-CEML films comprising five layers are depicted in each of FIGS. 1B and 2B, and are combined to form a 2-ply (outer and inner ply) structure in FIG. 3B. In accordance with the example embodiments, outer sealant layers and inner sealant layers (220), (120) may be made from an ethylene/α-olefin (EAO) copolymer (or "interpolymer"); first inner and outer interposed layers (230) or second outer and inner sealant layers (130) may be made from ethylene/α-olefin copolymer; and a non-barrier core-layer (110) of an LLDPE. In some embodiments, the EAO, including an LDPE or an LLDPE, may comprise an ethylene/octene-1, an ethylene/hexane-1, or an ethylene/butene-1 copolymer. In some particular further example embodiments the EAO copolymer may comprise a melt index of 0.8 dg/min-1.0 dg/min, and a density of 0.912 g/cm$^3$-0.916 g/cm$^3$, or may comprise one or more other copolymers or combinations of copolymers falling within those physical parameters. In some embodiments any of the layers in the barrier or non-barrier layers of the B-CEML or NB-CEML may be constructed from a single polymer layer or a plurality of polymer layers.

In embodiments, the outer sealant layer and the inner sealant layer may each comprise about 10-40% of the thickness of the NB-CEML film. In some embodiments comprising one or more interposed layers, each interposed layer may comprise about 5-20% of the thickness of the NB-CEML film. In some embodiments relating to a NB-CEML film that comprises a core layer, the core layer can comprise about 30-50% of the thickness of the NB-CEML film.

The total thickness of the NB-CEML film, in some embodiments, is about 1-5 mils, or about 1.5-4.0 mils, or about 1.8-3.8 mils in total film thickness. In some embodiments relating to flexible bags, the total thickness of the NB-CEML film comprises greater than 50% of the combined thickness of the NB-CEML and B-CEML films that may be used in a flexible bag. In some example embodiments the thickness of the NB-CEML ply of a flexible bag that comprises a B-CEML ply and a NB-CEML ply can be 50, 51, 52, 53, 54, 55, 56, 57, 58, 59, 60, 61, 62, 63, 64, 65, 66, 67, 68, 69, 70, 71, 72, 73, 74, or about 75% or more of the combined thickness of the barrier and non-barrier plies. In some embodiments of the flexible bags disclosed herein, a bag that comprises a NB-CEML layer that constitutes greater than 50% of the total thickness of the films that form the bag can provide for good self-evacuation/emptying of the flowable contents without the need for any additional evacuation device.

While a number of laminate films are known and have been made from a variety of polymers (e.g., polyolefins) and polymer blends, such as those described in U.S. Pat. Nos. 4,503,102; 4,521,437; 5,206,075; 5,364,486; 5,508,051; 5,721,025; 5,879,768; 5,942,579; 5,972,443; 6,117,465; 6,256,966; 6,406,765; 6,416,833; and 6,767,599 (all incorporated by reference in their entireties), in the aspects and embodiments described herein, a film may comprise one or more film layers that comprise ethylene/α-olefin (EAO) copolymers. Thus, the disclosure provides films wherein one or more EAO copolymer or EAO copolymer blends can be used to form the inner and outer sealant layers, the interposed layers, and the non-barrier core layer. The EAO copolymers are selected based on one or more functional or physical characteristics that can provide for improved impact resistance and bag drop performance, particularly under cold conditions, relative to conventional bags formed with multilayer films that do not include the ethylene/α-olefin copolymers as described herein.

Ethylene-α-Olefin Copolymer (EAO Copolymer)

The disclosure provides an EAO copolymer that may be used within the scope of the various aspects and embodiments described herein, and may comprise, for example, ethylene-C4 to C10-α-olefin interpolymer (copolymer). In some embodiments, the ethylene-C4 to C10-α-olefin interpolymer (EAO copolymer) has a melt index of from 0.2 to 2.0 dg/min, 0.4 to 1.5 dg/min, or about 0.5 to 1.0 dg/min (g/10 min); a density of from 0.890 to about 0.930 g/cm$^3$ (e.g., including particular values and narrower ranges falling within that range such as, for example, 0.912 g/cm$^3$-0.925 g/cm$^3$; 0.910 g/cm$^3$, 0.911 g/cm$^3$, 0.912 g/cm$^3$, 0.913 g/cm$^3$, 0.914 g/cm$^3$, 0.915 g/cm$^3$, 0.916 g/cm$^3$, 0.917 g/cm$^3$, 0.918 g/cm$^3$, etc.) and may be a single polymer or a blend of two polymers, or comprise several different individual polymer grades. As used herein, an "interpolymer" encompasses copolymers, terpolymers, and the like.

In some embodiments an EAO copolymer may comprise a zero shear viscosity ratio (ZSVR) in the range of from about 1.15 to 2.5 (e.g., including particular values and narrower ranges falling within that range). In some embodiments an EAO copolymer may comprise a molecular weight distribution, expressed as the ratio of the weight average molecular weight to number average molecular weight (Mw/Mn), in the range of 2.0 to 4.0 (e.g., including particular values and narrower ranges falling within that range).

The EAO copolymer may be selected from low-density polyethylenes (LDPEs), including linear, low-density polyethylenes (LLDPEs) and metallocene-derived LDPEs and LLDPEs (mLDPE, mLLDPE). According to some conventional industry descriptions, linear, low-density polyethylenes in the density range 0.915-0.930 g/cm$^3$ may be referred to as LLDPEs, and those in the density range of 0.900-0.915 g/cm$^3$ may be referred to as ultra-low-density polyethylenes (ULDPEs) or very low-density polyethylenes (VLDPEs).

Suitable polymers that may be used in forming various layers of the B-CEML and NB-CEML and having the performance characteristics disclosed herein are commercially available and sold under various tradenames and trademarks including, for example ExxonMobil Chemical (e.g., polyethylenes and performance PE polymers (EXCEED XP, EXCEED™, ENABLE™, EXXONMOBIL™ LDPEs, NEXXSTAR™ LDPE, EXXONMOBIL™ LLDPEs, EXXONMOBIL™ NTX LLDPE)) and Dow Chemical (e.g., polyethylenes (AFFINITY™, AGILITY™, ASPUN™, DOW™ LDPEs, DOWLEX™ ELITE™, INNATE™, XUS 59999.38)) as well as other commercial sources. The particular polymer(s) may be selected based on particular performance characteristics as described herein (e.g., density, melt index, zero shear viscosity, molecular weight distribution, etc.). In some particular embodiments the films comprise at least one polymer selected from the group of commercially available resins sold under the Dow INNATE™, Exxon EXCEED™, or Exxon EXCEED™ XP brands (e.g., DOW INNATE™ ST70 Precision Packaging Resin, DOW INNATE™ ST50 Precision Packaging Resin, DOW INNATE™ XUS 59910.03, and DOW INNATE™ TH60 Precision Packaging Resin (Dow Chemical Company, Midland MI); EXCEED™ XP 6026 Series, EXCEED™ XP 6056ML, EXCEED™ XP 8318ML, EXCEED™ XP 8358 Series, EXCEED™ XP 8656MK, EXCEED™ XP 8656ML, EXCEED™ XP 8784 Series, EXCEED™ 1012HJ, EXCEED™ 1012MA, EXCEED™ 1012MJ, EXCEED™ 1012MK, EXCEED™ 1015 Series, EXCEED™ 1018 Series, EXCEED™ 1018MA, EXCEED™ 1023MJ, EXCEED™ 1327MA, EXCEED™ 1518MA, EXCEED™ 1518MM, and EXCEED™ 2012 Series (ExxonMobil Chemical Company, Houston, TX). In some embodiments, the films comprise an ethylene/α-olefin copolymer compositions as disclosed in U.S. Pat. No. 9,115,275 which is incorporated by reference herein. Improved results are described in the illustrative examples disclosed below, and in accordance with the example aspects and embodiments provided throughout the disclosure. Some non-limiting examples of the above resins are listed in Table 1 below to provide some additional details regarding some of the physical characteristics of those non-limiting resins.

TABLE 1

Characteristics of several non-limiting resins.

| Identity/Name | Resin Description |
|---|---|
| Dow Elite AT 6401 | ULDPE: an ethylene/octene-1 copolymer; melt index 0.85 dg/min; density 0.912 g/cm3 |
| Dow Elite 5400 G | LLDPE: an ethylene/octene-1 copolymer; melt index 1.0 dg/min; density 0.916 g/cm3 |
| Dow XUS59900.100 | LLDPE: ethylene/octene-1 copolymer; melt index 0.85 dg/min; density 0.920 g/cm3 |
| Dow INNATE ™ XUS 59910.04 (16C181R01) | interpolymer of ethylene/octene-1 copolymer and a second ethylene/α-olefin copolymer, melt index 0.85 dg/min, density 0.915 g/cm$^3$ |
| Dow INNATE ™ XUS 59910.03 | interpolymer of ethylene/octene-1 copolymer and a second ethylene/α-olefin copolymer, melt index 0.85 dg/min, density 0.912 g/cm$^3$ |
| DFDC 7087 | LLDPE: an ethylene/butene-1 copolymer, melt index 1.0 dg/min, density 0.918 g/cm3 |
| Ampacet 10090 Slip Agent | Carrier resin LDPE, density 0.92 g/cm3, additive 5% erucamide |
| Ampacet 10063 Anti Block Agent | Carrier resin LDPE, density 0.92 g/cm3, anti-block additive 20% |
| EXCEED ™ resins | LLDPEs or ULDPEs based on an ethylene/hexene-1 copolymer; 1012 series - melt index 1.0 dg/min; density 0.912 g/cm3; 1015 series - melt index 1.0 dg/min; density 0.915 g/cm3; 1018 series - melt index 1.0 dg/min; density 0.918 g/cm3; 1023MJ - melt index 1.0 dg/min; density 0.923 g/cm3; 1327MA - melt index 1.3 dg/min; density 0.927 g/cm3; 1518MA - melt index 1.5 dg/min; density 0.918 g/cm3; 2012 series - melt index 2.0 dg/min; density 0.912 g/cm3; |
| EXCEED ™ 1012MA | LLDPE or ULDPE: an ethylene/hexene-1 copolymer; melt index 1.0 dg/min; density 0.912 g/cm3 |
| EXCEED ™ MVL1012MA | LLDPE or ULDPE: an ethylene/hexene-1 copolymer; melt index 1.0 dg/min; density 0.912 g/cm3 |
| EXCEED ™ XP resins | LLDPEs based on ethylene/hexene-1 copolymers; melt index ranging from 0.5-1.0 dg/min; density ranging from 0.914-0.918 g/cm3 |
| EXCEED ™ XP 8656ML | LLDPE: an ethylene/hexene-1 copolymer; melt index 0.5 dg/min; density 0.916 g/cm3 |

Film Structure and Composition

Barrier Film Core Layer

The barrier, co-extruded, multi-layer (B-CEML) film comprises at least one core-layer that is adjacent to the first at least one interposed layer on one side and the second at least one interposed layer on the opposite side. At a minimum, at least one layer of the core-layer comprises EVOH, such that the overall thickness of all layers comprising EVOH is less than about 5% or about 10% of the total thickness of the B-CEML, or about 5% of the combined B-CEML and NB-CEML. In some embodiments, the thickness of the barrier core layer can comprise about 0.1-5% of the total thickness of the barrier multilayer film. If an interposed layer is not used in the multilayer film, the core layer is adjacent to the sealant layers on either of its sides.

In embodiments, the core layer comprises a single layer but, in alternative embodiments, it can also comprise a multi-layer construction, each layer having the same or similar EVOH polymer blend as described herein. The thickness of the barrier core layer can comprise about 0.1-10% of the total thickness of the barrier multilayer film. In some embodiments, the thickness of the barrier core layer can comprise no more than about 5% of the total thickness of the barrier multilayer film. In some additional embodiments, the thickness of the barrier core layer can comprise about 0.1-5% of the total thickness of the combined non-barrier and barrier multilayer films (e.g., EVOH comprises 5.0% or less of the combined barrier and non-barrier plies of a flexible bag in accordance with the disclosure). Thus, the core barrier layer comprises EVOH such that, in some embodiments, the combined thickness of one or more core barrier layers comprising EVOH is less than 5% thickness of the B-CEML film and/or the combined two-ply NB-CEML and B-CEML film. Thus, in some embodiments, and in particular embodiments relating to flexible bags, the combined thickness of the EVOH layers, whether in the B-CEML or in a bag comprising B-CEML and NB-CEML plies, is less than any one of the following numbers, as percent of the total film thickness (or alternatively % weight): 5.0, 4.9, 4.8, 4.7, 4.6, 4.5, 4.4, 4.3, 4.2, 4.1, 4.0, 3.9, 3.8, 3.7, 3.6, 3.5, 3.4, 3.3, 3.2, 3.1, 3.0, 2.9, 2.8, 2.7, 2.6, 2.5, 2.4, 2.3, 2.2, 2.1, 2.0, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, and 0.1. In embodiments, the combined thickness of the EVOH layers is less than a number within a range defined by any two of the above numbers, including end-points, as percent of the total B-CEML thickness. In another embodiment, the combined thickness of the EVOH layers is less than a number within a range defined by any two of the above numbers, including end-points, as percent of the total B-CEML or combined B-CEML/NB-CEML thickness (e.g., EVOH comprises 5.0% or less of the combined barrier and non-barrier plies of a bag).

In embodiments, the ethylene molar percent in the EVOH copolymer is greater than 35%. In one embodiment, the ethylene molar percent in the EVOH copolymer is in the range of 38% to 55%. Thus, embodiments provide for an ethylene molar percent in the EVOH copolymer selected from the following set of numbers: 38, 39, 40, 41, 42, 43, 44, 45, 46, 47, 48, 49, 50, 51, 52, 53, 54, and 55.

In one embodiment, the barrier-ply of the film disclosed herein comprises a co-extruded, multi-layer (CEML) film structure comprising an outer-sealant layer, a barrier core layer, and an inner sealant layer. In embodiments, the multi-layer film comprising a layer within the barrier core layer comprises EVOH that contains 44 mol % ethylene, with a maximum thickness of EVOH at 5% of total multi-layer film thickness.

In one embodiment, EVOH can be a single core-layer in a symmetrical or nonsymmetrical structure, or multiple layers or micro-layers in a multi-layer structure, if the total combined thickness of the EVOH is equal to or less than 5% of the total structure thickness. Multiple layering and multiple micro-layer technology is available to those of skill in art and are incorporated by reference herein (see, for example, U.S. Pat. No. 5,094,793, US PGPUB 20100215879, US PGPUB 20140044906, US PGPUB 20180215121, US PGPUB 20170197348, US PGPUB 20140044906, US PGPUB 20120077005 incorporated herein by reference in their entireties).

In embodiments, the EVOH has 44 mol % ethylene content (for example, EVALCA EVAL™ E grade). In other embodiments, other lower-oxygen barrier EVOH grades can be included, such as the 38 and 48 mol % ethylene varieties.

The Outer and Inner Sealant Layers (OSL, ISL)

In example embodiments the disclosure provides multi-layer films (e.g., B-CEML and NB-CEML) that comprise at least one outer sealant layer and at least one inner sealant layer. The outer sealant layer of a film is identified and oriented toward the external side of the film (i.e., most distant from the interior/product-contacting side of the film), while the inner sealant layer, while also an external layer of the multi-layer film, is closest to the interior side of the packaging (i.e., contacts the product). The thicknesses of the outer and inner sealant layer may be the same, but in some embodiments the inner and outer sealant layers can have different thicknesses. In embodiments, the outer or inner sealant layers can comprise more than one layer of film, for example, 2, 3, 4 or more (e.g., up to about 50) layers of film.

In embodiments, the sealant layers can comprise about 10-100% by weight of an ethylene/α-olefin copolymer or combinations thereof, in accordance with those described throughout the disclosure, and can contain up to 100% by weight of a polymer of ultralow density polyethylene (ULDPE) or linear low density polyethylene (LLDPE), which in some embodiments comprises an ethylene/α-olefin copolymer, where the α-olefin chain may be from 4 or more carbons (e.g., butene-1) or 6 or more carbons (e.g., hexene-1) or 8 or more carbons (e.g., octene-1), or combinations thereof, having a density in the range of about 0.910 to 0.914 g/cm$^3$ and a melt index of about 0.7 to 1.0 dg/min. In some embodiments, the sealant layers may comprise an amount (e.g., about 5-50%) of a linear low density polyethylene (LLDPE), which in some specific embodiments comprises an ethylene/hexene-1 or an ethylene/octene-1 copolymer, or combinations thereof, having a density in the range of about 0.915 to 0.925 g/cm$^3$ and a melt index of about 0.7 to 1.0 dg/min.

In some embodiments, the copolymer comprising the sealant layers can comprise about 75-90% by weight of an ultralow-density polyethylene (ULDPE), having a density in the range of about 0.911 to 0.913 g/cm$^3$ and a melt index of about 0.8 to 0.9 dg/min; and 10-25% by weight of a linear, low-density polyethylene (LLDPE), which may comprise an ethylene/α-olefin copolymer (e.g., ethylene/octene-1 and/or ethylene/hexane-1), having a density in the range of about 0.918 to 0.922 g/cm$^3$ and a melt index of about 0.8 to 0.9 dg/min. In some embodiments, the sealant layers copolymer can comprise a density of from about 0.910 to about 0.925 g/cm$^3$ (e.g., 0.917 g/cm$^3$, 0.915 g/cm$^3$, 0.912 g/cm$^3$, etc.) and a melt-index of about 0.7 to 1.0 dg/min, (e.g., 0.9, 0.8, etc. dg/min). In embodiments, the density range can also be defined by any two values, in g/cm$^3$, that follow, including the end-points: 0.910, 0.911, 0.912, 0.913, 0.914, 0.915, 0.916, and 0.917 g/cm$^3$.

In some example embodiments, the thickness of each of the sealant layers is from about 1% to about 25% of the total thickness of the CEML films. Stated another way, each of the inner and the outer sealant layers can have a thickness (or weight), expressed as percentage of total thickness (or weight) of the CEML film, of 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, and 25%.

In some embodiments, the thickness of the sealant layers is within a range defined by any two numbers given above, including the endpoints. The thickness of the sealant layers can also be intermediate percentages between the percentages cited, supra, for example, from about 11.1%, 11.2%, 11.3%, 11.4%, and the like (for example, between 11% and 12% cited above).

Interposed Layer

In accordance with the example embodiments described herein, the films comprise one or more interposed layers that may comprise the same or similar polymeric materials in the same or similar ratios as the sealant layers described above, and can further comprise additional polymeric constituents and additives, for example, variations of density and melt index in the above ranges, the polymeric constituents can have different ratios, and adhesives and tie materials may be added to aid in film formation.

In accordance with the example aspects and embodiments described herein, the films may comprise a plurality of interposed layers (e.g., second, third, fourth, fifth, etc. inner and outer interposed layers). Typically, any layer that is not disclosed or described as a core layer or a sealant layer is characterized as an "interposed layer" and in embodiments that comprise more than one interposed layer, the interposed layers adjacent to the sealant layers are identified as the "first" inner/outer interposed layer, and subsequent interposed layers identified as second, third, fourth, as they become closer to the interior core of the film.

While either the barrier or non-barrier co-extruded multi-layer (NB-CEML) films disclosed herein may comprise an interposed layer adjacent to a sealant layer and adjacent to the core layer, the term is intended to be used in accordance with this disclosure to refer to polymer or copolymer layers that are positioned between a sealant layer and the core layer, or between two or more core layers in a B-CEML and NB-CEML film (i.e., some core layers in NB-CEML may not include a barrier layer such as EVOH, for example). Thus, in some embodiments, either or both of a NB-CEML or B-CEML may comprise first interposed layer(s) and/or second interposed layer(s) such that, for example, the multi-layer film can have one or more interposed layers positioned between the sealant layers and the core/core barrier layer, and/or two or more core/core barrier layers. In some embodiments, as described for the sealant and core layers, the interposed layers may comprise multiple individual layers (e.g., up to about 45 or 50 layers) that together form the first (or second or more) interposed layers.

Thus, in some embodiments the interposed layers may comprise an ethylene/α-olefin copolymer, in accordance with those described throughout the disclosure. In some embodiments, the copolymer can comprise an ethylene/α-olefin copolymer, or combinations thereof, (the α-olefin based on a carbon chain length of 4 or 6 or 8 or more) having a density (or density when combined) of from about 0.910 to about 0.925 g/cm$^3$ (e.g., 0.917 g/cm$^3$, 0.915 g/cm$^3$, 0.912 g/cm$^3$, etc.) and a melt-index of about 0.2-2.0 dg/min, or about 0.5-1.0 dg/min, or about 0.7 to 1.0 dg/min, (e.g., 0.9, 0.8, etc. dg/min). In embodiments, the density range can also be defined by any two numbers referred to below, in g/cm$^3$ including the end-points: 0.910, 0.911, 0.912, 0.913, 0.914, 0.915, 0.916, and 0.917 g/cm$^3$. Similarly, the melt-index range can be defined by any two numbers described above, in dg/min, including the end-points, and in some particular embodiments may be 0.5, 0.6, 0.7, 0.8, 0.9, and 1.0 dg/min. In some embodiments, the total thickness of each interposed layer may range from about 1% of the total film to about 40% of the total film thickness.

In some embodiments, the interposed layer comprises an amount of an agent, such as a tie material (e.g., tie resin or adhesive), that facilitates binding and adhesion of the interposed layer to the core barrier EVOH layer, and optionally, to other interposed layers and/or sealant layers. Any known tie resins and adhesives may be used in the interposed layer including, for example, polyethylene copolymers of polar and nonpolar repeat units, with or without functional reactive groups. Modifiers may be added to further improve certain physical properties such as peel strength of such binders, adhesives, and tie resins. Some non-limiting examples of tie resins include non-reactive tie resins, such as ethylene vinyl acetate (EVA), ethylene methyl acrylate (EMA), acid modified olefin copolymers (e.g., ethylene acrylic acid (EAA) and ethylene methacrylic acid (EMAA)) and reactive tie resins such as anhydride modified polyethylene (i.e., ethylene-grafted maleic anhydride, (AMP)).

Non-Barrier Film Core Layer

The non-barrier, co-extruded, multi-layer (NB-CEML) film may comprise a core layer that is adjacent to the inner and outer sealant layers or interposed layers, and generally positioned in the interior of the film's layer structure. In embodiments wherein the NB-CEML comprises an interposed layer in the multilayer film, the core layer is adjacent to the interposed layer(s) on either of its sides. In embodiments, the core layer may comprise a polymer or a polymer blend of: 0-100% by weight, about 30-70% by weight, or about 30-50% by weight of a linear, low-density polyethylene (LLDPE) of ethylene/octene-1 copolymer having a density of about 0.910 to 0.920 g/cm$^3$ and melt index of about 0.8 to 1.2 dg/min. In embodiments, the core layer may further comprise 0-100% by weight of a linear, low density polyethylene (LLDPE) such as ethylene/butene-1 copolymer, or low density ethylene/hexene-1 copolymer, having a density of about 0.918 to 0.930 g/cm$^3$, and a melt index of about 0.8 to 1.2 dg/min, or about 70-30% by weight, or 50-70% by weight said copolymers.

In yet further embodiments, the core-layer comprises a polymer blend of: 35-45% by weight of a linear, low-density polyethylene (LLDPE) of ethylene/octene-1 copolymer having a density of about 0.914 to 0.918 g/cm$^3$, and a melt index of about 0.9 to 1.1 dg/min; and 55-65% by weight of a linear, low-density polyethylene (LLDPE) of ethylene/butene-1 copolymer having a density of about 0.918 to 0.920 g/cm$^3$ and a melt index of about 0.9 to 1.1 dg/min.

Depending on the product and the conditions under which the product is stored, shipped and used, the NB-CEML core layer can comprise up to 100% by weight of an ethylene/α-olefin copolymer in accordance with those described throughout the disclosure. The percentage of the copolymer can vary from 5, 10, 20, 30, 40, 50, 60, 70, 80 and 90% and any amounts between depending on the properties desired or required for the NB-CEML film. In embodiments, the core layer may be a single layer but can also comprise a multi-layer construction, each layer having the same or similar polymer blend within the above ranges. The thickness of the NB-CEML core layer can comprise about 30-50% of the total thickness of the multilayer NB-CEML film.

Uses

In embodiments, the disclosure provides flexible liquid-packaging bags comprising two or more plies, wherein at least one ply comprises a barrier ply (B-CEML film) and at least one ply comprises a non-barrier ply (NB-CEML film) in accordance with the aspects and embodiments described above. Thus, the barrier-ply comprises a B-CEML film structure comprising EVOH at 5% or less total thickness of the ply or of the combined B/NB plies. In accordance with such embodiments, the flexible bag excludes (i.e., does not comprise or consist of) nylon, polyester or metal such as, for example, vacuum deposited metal coating or aluminum foil. In embodiments, the outer-ply of the bag comprises the EVOH-containing B-CEML film structure in accordance with the disclosure, and the inner-ply of the bag can comprise the non-barrier film containing no EVOH. In some further embodiments, the non-barrier inner ply of the bag is thicker than the barrier outer ply in a ratio ranging from about 1.1:1 to about 3:1 and inclusive of any ratio within that range (e.g., 3.8 mil:1.8 mil). In such embodiments, the thickness of the inner ply may result in better self-evacuation efficiency of the contents in the flexible bag.

In one embodiment, the EVOH-containing barrier-ply or plies can form the outer ply or plies of a flexible bag (e.g. outer and middle ply of multi-ply bags), and the non-barrier ply can form the inner ply of the bag. Alternatively, the barrier ply can be placed as the inside ply of the bag.

In embodiments, the bag-size can range from 0.5 US gallons to 10 US gallons (e.g., about 1, 2, 3, 4, 5, or 6 gallons). In some embodiments size can also be extended to bulk bags in the 10-45 and the 45-400 gallons size range (i.e., the bags may span a large size range from about 0.5 US gallons to about 400 US gallons). In some embodiments, the bags may comprise a plurality of plies (i.e., there can be more than two plies in the bag). Such embodiments, for example, may comprise a combination of two barrier plies and one non-barrier ply, or one barrier ply and two non-barrier plies in various structural arrangements. In accordance with the above aspects and embodiments, the thickness of the EVOH-containing barrier-ply in such bags, can vary from 1 mil to 10 mil, and may, in some particular embodiments be about 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0 mils, (where 1 mil is equal to about 25 mm). In embodiments, the thickness of the non-barrier ply can have about the same thicknesses as described above for the barrier ply (e.g., ranging between thicknesses of 1.5 mil to 5.0 mil, 2.5 mil to 5.0 mil, 1.5 mil and 4.0 mil, and similar ranges within the general range above). In yet further embodiments, the thickness of the non-barrier ply is greater than the thicknesses as described above for the barrier ply, as described above.

In some embodiments, the flexible bag is used for packaging concentrated soft drink syrup (e.g. a beverage bag). In some embodiments, the flexible bag is used for packaging edible oil. In some embodiments, the flexible bag is used for packaging liquid dairy-based products (ambient or refrigerated conditions). In some embodiments, the flexible bag is used for packaging non-food, industrial fluids or chemicals. In some embodiments, the flexible bag contains pigmented layers to provide color (white, blue, black, etc.).

Figure 4A:
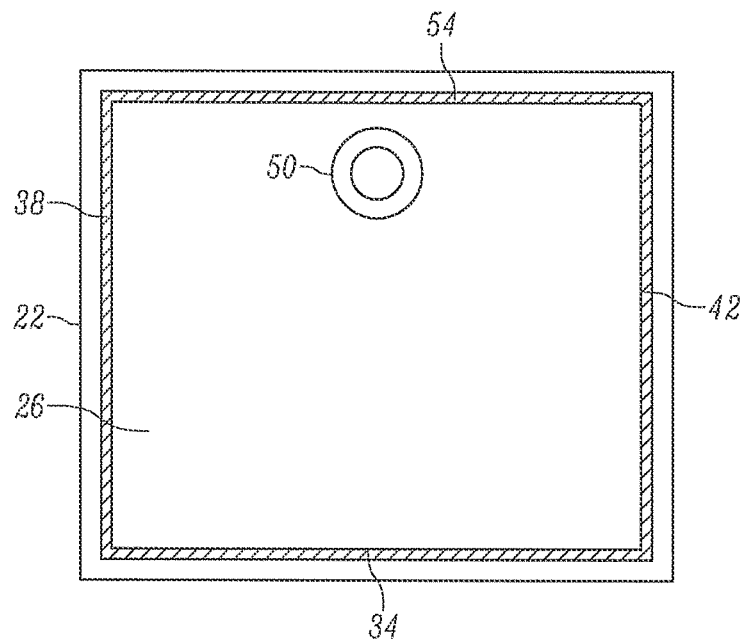
FIGS. 4A and 4B provides a generic depiction of a flexible bag (22), in unfilled form (4A) and containing flowable product (4B), in accordance with example embodiments of the disclosure wherein the bag comprises at least one spout (50), which may be located at different positions on the bag, and sealed perimeter edges (34, 38, 54, 42) that define the volume (26) containing flowable contents.
Figure 4B:
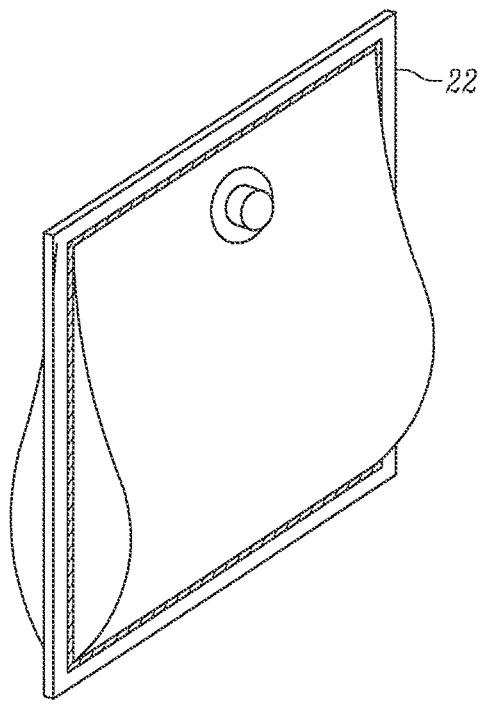

In embodiments, the bags comprise a maximum amount of EVOH in the complete bag structure to be no more than 5.0%, 4.5%, 4.0%, 3.5%, 3.0%, or 2.5% total thickness, or weight of a film structure. In embodiments comprising a barrier and non-barrier ply structure, the total amount (percent thickness or weight) of EVOH in the entire ply structure is reduced as non-barrier film plys contain no EVOH. In embodiments relating to bag structures, no nylon, no PET, no metallization is included. In some embodiments the bags do not comprise any thermal or adhesive laminates. In some embodiments the bags are produced for packaging liquids at ambient temperature such as concentrated beverage syrups, edible oils, as well as industrial liquids such as soaps, detergents, and the like. As described herein, the flexible bags in accordance with the disclosure may find use in distribution and dispensing of viscous liquids such as foodstuffs (e.g., premix syrups for preparing drinks). The bags typically comprise thin, flexible plastic walls, sealed on the edges, and having a dispensing spout or fitment sealed to the wall of the bag. See, e.g., FIGS. 4A-4B. The generic depiction of the bag in FIGS. 4A-4B are merely illustrative of non-limiting embodiments of the disclosure. As described herein, the flexible bags may be designed and manufactured to any number of specifications (e.g., including more than one fitments at various locations, different bag shapes, deltas in any one or more bag corners, hanger holes, and other structures generally known in the art).

In use, the flexible bag is filled with a flowable material to be dispensed, and the bag may be packed in a relatively rigid container, e.g., a corrugated cardboard box, for distribution (e.g., a "bag-in-box"). Typically, at the point of use, the spout or fitment on the flexible bag is adapted to mate a dispensing tap or service line connector is fitted thereto to control and direct the dispensing of the contents of the bag. Because the walls of the bag are thin and very flexible, the bags that find common use may collapse as the contents are removed. A problem that occurs in the state of the art, and which the flexible bags in accordance with the aspects and embodiments of the disclosure address, is that when the liquid contents of the bag are dispensed, it is possible that one of the flexible bag walls may be drawn close to the spout, even when a substantial proportion of the contents remain in the bag. The bag wall may come to cover the inner end of the spout, thus blocking it and shutting off flow of contents. Because of the pressure of the remaining liquid in the bag on the wall, it is difficult and troublesome to dislodge the wall from the spout and remove the blockage. This has typically been addressed in the art by incorporating one or more evacuation aids that are designed and adapted to maintain flow by preventing blockage by bag collapse.

In some embodiments, the flexible bags in accordance with the disclosure can maintain flow and output of the bag contents without the need for dispensing aids that are known in the art such as evacuation channels, tubes, forms, dip strips or reinforced/embossed films that can help to ensure complete evacuation of bag contents. Unexpectedly, the inner and outer plies of the bags disclosed herein, while exhibiting improved toughness, are structured to provide adequate rigidity to the bag geometry and allows for the complete self-evacuation of its flowable contents. That is, it has been unexpectedly observed that the flowable contents within the flexible bags of the disclosure reach and flow to and through the spout even as the bag is completely or substantially complete drained of its contents, without the need for any additional evacuation aid(s).

Thus, the flexible bags are convenient because they can be manufactured to be relatively flat in the unfilled condition, and, accordingly, are convenient to store and to ship to a location where they are to be filled (the bag geometry is not distorted by the incorporation of an evacuation aid). Furthermore, the bags in accordance with the example embodiments of the disclosure to not require any insertion of a device into the bag after it is formed which reduces the manufacturing burden.

Furthermore, the bags in accordance with example embodiments of the disclosure are well adapted for use with service line connectors that are provided with quick-disconnect fittings and valves. Such quick-disconnect fittings and valves may use a valve element that slides within the fitment or spout, projecting into the bag when actuated by the insertion of a service line connector and being withdrawn within the fitment to cut off the flow of contents when the connector is withdrawn. In such applications, the bags of the disclosure avoid any possible interference between the slider of such a valve and an evacuation channel or structure that would be attached to the spout or to its periphery.

In use, the bags in accordance with example embodiments of the disclosure are able to achieve self-evacuation of the flowable materials/contents to levels that are in line with industry demands (i.e., evacuation of 95% or more of the contents (95%, 96%, 97%, 98%, 99%, 99.5%, 99.6%, 99.7%, 99.8%, or 99.9%)) without the need for evacuation aid devices. This observed level of emptying without the need or aid of an incorporated evacuation structure is unexpected and provides a substantial advantage to the flexible bags described herein relative of the current state of the art. In use, the observed excellent degree of contents evacuation is achievable in a variety of flexible bag, or bag-in-box, orientations such as, for example, with the dispensing spout bottom-facing as well as side-facing arrangements.

Additives

In some embodiments, the films may comprise standard additives generally known and used in the art including, for example, antioxidants, stabilizers, anti-block agents, and slip additives. Optionally, any one or more of the sealant layers, or the interposed layers may comprise one or more additives that may facilitate the processing of a film in a bag making process, such as, for example, polymer processing aid concentrate, and/or slip/anti-block concentrates. Any of such additives that are generally known and find use in the art can be used, including additives of the types that follow.

Slip Agents

Any slip agent known in the art may be included in the film layers, typically in a range from about 200 to 2000 ppm or 0.5-2.5% by weight of the particular layer. In some embodiments a slip agent may be added in less that about 200 ppm (even to none, i.e., 0 ppm) if anti-blocking agent is added in amounts that provide some function that would be provided by addition of one or more slip agent(s). Non-limiting examples of a slip agent is erucamide or other fatty acid amides, such as, oleamide. The slip agent may lower the coefficient friction of the film and allows it to slide readily over various surfaces.

Anti-Blocking Agents

Any film anti-blocking agent known in the art may be added to the film layers, typically in the range of about 1000-5000 ppm or 0.5-2.5% by weight of a sealant or interposed layer. However, in some embodiments the amount of anti-blocking agent(s) can be increased to about 10,000 ppm without having any negative impact on the properties and performance characteristics of the film. For example, typical anti-blocking agents, such as, diatomaceous earth, synthetic silica or talc can be added to the inner and outer sealant layers of the film. The anti-blocking material may help reduce the coefficient of friction between the film and the metallic surfaces over which the film is drawn during the bag making process.

Processing Aids

Any processing aid known in the art, such as the non-limiting example of a fluoro-elastomer based polymer may be added to outer and inner sealing layers of the film.

The films disclosed herein may be used in the manufacture of a variety of articles, include a flexible-bag containing a flowable material, said flexible bag being made from the previously described multi-layer film in tubular form and having transversely heat sealed ends.

In some embodiments the disclosure provides a process for making pouches filled with a flowable material, using a conventional bag making process described herein. Pouches can be made using a vertical form, fill and seal ("VFFS") apparatus, in which each pouch is made from a flat web of film by forming a tubular film therefrom with a longitudinal seal and subsequently flattening the tubular film at a first position and transversely heat sealing said tubular film at the flattened position, filling the tubular film with a predetermined quantity of flowable material above said first position, flattening the tubular film above the predetermined quantity of flowable material at a second position and transversely heat sealing said tubular film at the second position, the improvement comprising making the pouches from a flat web of a film made from a multilayer film described previously. The VFFS processes and its modifications are described in U.S. Pat. Nos. 5,538,590, 9,327,856 and 9,440,757 and are incorporated by reference herein in their entirety.

Although melt-index ranges are described in the various aspects and embodiments, it is understood that the polymers have melt indices typical of film-grade polymers can be used. The multi-layer films of the present invention have the ability to form a lap seal as well as a fin seal. They also substantially reduce the curl in the laminate.

One method of manufacturing film is the so-called blown film process. The film, after manufacture, is slit longitudinally into appropriate widths. The method of manufacture of a multilayer film is by using a blown film co-extrusion process, although other methods of manufacture of the film may be used.

Flexible Bags & Plies in Bulk-Bag

As discussed herein, the disclosure provides for bags that incorporate a barrier layer of EVOH in a polyolefin film, resulting in bags that have sufficient flex-crack resistance, sufficient toughness, and sufficient barrier properties for short shelf-life flowable materials, but are recyclable, because they do not contain any nylon or PET, or their metalized versions. In particular embodiments, the flexible packaging constructed from the films disclosed herein may have a broad range in size, from small pouches (e.g., 100 mL–2,500 mL), small bags (for example, 1-6 USG) or bulk (for example, 50-400 USG) bags comprising the NB-CEML and B-CEML films are used to package liquids from including, for example, dairy products, milkshakes, confectionaries, chili, coffee, vegetable and fruit juices, sauces, and purees. It was found that including a small amount of EVOH—less than 5% by thickness of the film, or less than 5% by weight of the film—surprisingly resulted in improved flex-crack resistance, improved toughness, and improved barrier properties over the benchmark measures. This also provides for the option to exclude the use of materials such as nylon, PET, or their metalized versions for barrier properties, which would otherwise render the films and bags from such film non-recyclable.

In embodiments, the flexible bags do not have any liner, providing liner-less bags that may be single-ply or multi-ply bags, but without a liner. In embodiments a thermally laminated polymeric film structure is made comprising B-CEML type films disclosed herein.

The bags that may be produced from the B-CEML/NB-CEML films may be pre-made and then filled with food, through a fitment. They are often sterilized and may be, for example, irradiated in a batch process, employing standard radiation conditions known in the art. The film may also be sterilized rather than the bags. Sterilization can be achieved in a variety of known ways such as by exposure of the film or bag to hydrogen peroxide solution. The films used to make pouches may be similarly treated prior to package formation.

Bag Production

In an aspect, bags may be produced by a method comprising the steps of providing one or more films as described herein including a barrier CEML film, securing a spout to inner and outer plies of the film structure through a hole provided therein, sealing the plies together transversely across the width of the film structure, to form a top seal of one bag and a bottom seal of the bag and a top seal of an adjacent bag, then sealing the plies together parallel to the length of the bag line are applied at either side of the polymeric films, and trapped air being removed prior to completely sealing the bag, and separating the bags immediately or just prior to use. Typical bag-making processes are described generally in U.S. Pat. No. 8,211,533, which is incorporated by reference herein. In some embodiments the process for making bags that are fillable with flowable material, may comprise using a bag line, wherein each bag is made from a flat web of film that may comprise the following steps:
- (I) Unwinding film from two rolls top and two rolls bottom.
- (II) Ink jet code labeling each bag.
- (III) Punching spout hole in each bag.
- (IV) Inserting spout into bag.
- (V) Brush bag to remove entrapped air.
- (VI) Cross seals formed on bottom of one bag and top of next bag.
- (VII) Long seals formed.
- (VIII) Bags pulled through line with servo drive.
- (IX) Perforations formed between adjacent cross seals.
- (X) Bags pushed to end of line via conveyor belt.
- (XI) Bags packed into boxes.

The above steps are typical for a bag making machine. It should be noted that the order of the steps can be changed depending on the bag-making machine.

The examples that follow will help to provide further illustration and clarity to the disclosure and the aspects and embodiments described above.

EXAMPLES

Example 1: Coextrusion of Multi-Layer Films and Bags Comprising the Films

The examples detail sets of experiments that prepare multi-layer films using film extrusion processes that are generally known and used in the film manufacturing industry. The films can be extruded on a conventional extrusion line for multilayer films such as a three-layer, five layer, seven-layer, nine-layer or even more, blown-film, co-extrusion line. Films based on the resin compositions in accordance with the aspect and embodiments of the disclosure can also be made using other film extrusion processes known and used in the film manufacturing industry.

Non-limiting example operating conditions for preparing multilayer films can include those in Table 2:

TABLE 2

| Coextrusion of Multi-layer Films - Conditions | |
| --- | --- |
| Parameters | Magnitude |
| Line Throughput | 350 lbs/hr (160 K/hr) |
| Blow-Up Ratio | 2.5 |
| Lay-Flat | 38.65 in (97.80 cm) |
| Rolls Double-Wound 2-Up | 16.75 in (42.54 cm) width |
| Each Roll OD | 9.5 (24 cm) in Except for One Set of |

TABLE 2-continued

| Coextrusion of Multi-layer Films - Conditions | |
| --- | --- |
| Parameters | Magnitude |
| (Outside Diameter) | Rolls at 8.25 in (21 cm) OD |
| Die Size | 250 mm |
| Die Gap | 2 mils (51 mm) |
| Air Ring and IBC Cooling | 50° F. Using Air Cooled by Chilled Water |
| Rotating Nip | At Carouse |
| Auto-Gauge | Control On |
| Treaters | Off |

The film thicknesses may vary as described herein, but may suitably be from about 1.5 or 1.8 mils (or about 38-45 microns) to about 3.8 mils (or about 96.5 microns).

The films are used to prepare bags for testing (e.g., 5 gallon bags) at typical productions rates (e.g., rate of 25 bags/min). Two-ply bags are made where edges of the bag are heat-sealed together, for example, using common techniques (e.g., thermic sealing, e.g., using a a Maverick bag line, or impulse sealing and the like). The general dimensions of a 5 gallon bag may be about 18.75-inch outside width and 24.75-inch outside length. An opening with a spout and cap can be formed in the bag.

The films were formed utilizing typical extrusion conditions as described or otherwise known in the art. The barrier CEMLs include an EVOH layer within their core-layer stack, and are used to provide example embodiments of the disclosure.

Bruceton Stair-Drop Test (Version of ASTM D 5276 A 2.4.2)

The Bruceton Stair-Drop test is performed to evaluate bag strength/resilience. Typically the test includes a set (e.g., about 30) of bags. A first bag is positioned with the longitudinal axis of the bag coincident with an imaginary horizontal line, the bottom surface of the bag at a suitable initial drop height (e.g., 8 feet) and the vertical seal facing upwards. In this orientation, the bag is dropped onto a stainless steel sheet, and then inspected visually and tactilely for damage or leaks. Depending on intended use of the bag the test can be conducted by maintaining a constant or consistent bag temperature between tests (e.g., at about 4° C., ambient, or 40° C.).

If the first bag survives the drop test, intact, without leaking water, then a new bag is selected and dropped from a height of an additional 1 foot, e.g., 9 feet. Alternatively, if the first bag develops a leak, a new bag is selected and dropped from a height, which may lower (e.g., 7 feet). The testing continues, using a new bag for every drop, until at least 5 passes and 5 failures occur in the height range where both passes and failures are occurring. The 50% failure height is then calculated using the statistical method of ASTM 1 D 5628. Certain of the drop tests provided below were performed as follows: the flexible bags are filled to approximately 41.6 lbs (19 kg) total weight. The bags are dropped flat with the fitment facing up. The temperature of the water in the bags is recorded. For each test, 30 bags are dropped. The F-50 value is the median bag-drop height, in feet. The water temperature in the filled five-gallon bags during Bruceton drops is 60-65° F. (15-18° C.).

Flex-Crack Resistance

The Gelbo Flex test was used to determine the flex-crack resistance of films used for preparing flexible bags of the present invention and for the comparative or benchmark or control samples. The test is described below. A surprisingly improved flex-crack resistance performance was observed with the film in accordance with the aspects and embodiments of the disclosure relative to comparative embodiment films. The comparative films are alternatively also called "control" or "reference" films or embodiments.

This test determines the resistance of flexible packaging materials and films to pinhole failures resulting from flexing. However, it does not measure any abrasion characteristic relating to flex failure. The colored-turpentine portion of the test measures the failures characterized by physical holes completely through the structure.

The Gelbo Flex tester is set up to test in accordance with ASTM F-392. This apparatus consists essentially of a 3.5-inch (90 mm)-diameter stationary mandrel and a 3.5-inch diameter movable mandrel, spaced at a distance of 7 inches (180 mm) apart, from face-to-face, when at the start position—that is, maximum distance—of the stroke. The film-sample sides are taped around the circular mandrels so that it forms a hollow cylinder between them. The motion of the moving mandrel is controlled by a grooved shaft, to which the moving mandrel is attached. The shaft gives a twisting motion of 440 degrees, and at the same time moves itself toward the stationary mandrel crushing the film such that the mandrels facing each other end up only 1-inch apart, at their minimum distance. The motion of the machine is reciprocal with the forward and return strokes completing a full cycle. The machine operates at 45 cycles per minute.

In this tester, specimens of flexible materials are flexed at standard atmospheric conditions (23° C. and 50% relative humidity), unless otherwise specified. The number of flexing cycles can be varied depending on the flex-crack resistance of the film structure being tested. The flexing action produced by this machine consists of a twisting motion, thus repeatedly twisting and crushing the film. Flex-crack failure is determined by measuring pinholes formed in the film. The pinholes are determined by painting one side of the tested film sample (300 cm$^2$ in area) with colored turpentine and allowing it to stain through the holes onto a white backing paper or blotter. Pinhole formation is the standard criterion presented for measuring failure, but other tests such as gas-transmission rates can be used in place of, or in addition to, the pinhole test. The results reported are the average of four repeats.

Provided below are Gelbo Flex data that were produced at a much higher number of flex cycles than suggested in the ASTM method-10,800 vs. the normal 2,700 cycles for the co-extruded films. Higher number of cycles, that is 10,800 cycles, was used to test differences between the two samples because this provides a better correlation for what happens in the field.

Oxygen Transmission

The OTR test determined the reduction in oxygen transmission in the film used for preparing flexible bags of the present invention. The test is described below.

A suitably sized sample of film was cut on the cutting mat using the MOCON template for the Mocon Oxtran machine. The cut sample film was then positioned into the Mocon Oxtran and clamped into position as per the specific machine requirements. The machine was set up to the ASTM D3985 standard. The parameter settings are based on industry standard tests. The test temperature was set to 23° C. and 60% RH. The sample was tested until the graph showed a plateau, and test times varied from 8 hours to 70 hours depending on the graph curve. All results were captured in units of cm$^3$/100 in$^2$-day.

Bags from NB-CEML Inner-Ply and B-CEML Outer-Ply

Embodiment 1

Flexible bags, in accordance with the aspects and example embodiments of the disclosure are prepared for testing using a two-ply structure in a five-gallon dimension. The outer ply of the flexible bags comprises the following structure: 3.8-mil (96.5 micron) thick; symmetrical; coextruded; seven-layered film, with an EVOH (44 mol % ethylene) layer as the barrier core layer of 2.5-5.0% thickness of the barrier film (approximately 3.0-4.8 micron and, in some example measurements identified at 3.3 microns). The EVOH layer thus represents about 3.4% (3.4% using the measured 3.3 micron), and less than 5% of the total thickness of the outer barrier ply. The inner-ply of the flexible bags comprises the following structure: 1.5-mil (38 micron) thick; symmetrical; coextruded; five-layered film without any EVOH in the core layer. Tables 3 and 4 provide a general overview of the ply structures that may be used in accordance with the aspects and embodiments of the disclosure and the illustrative example embodiments.

TABLE 3

Overview of barrier outer ply

| Layer | % total (thickness) | Purpose | Composition |
|---|---|---|---|
| 1 - sealant | 21.5 | Sealing | 100% mLLDPE or LLDPE (e.g., Dow INNATE XUS 59910.03 at 0.912 density) |
| 2 - interposed | 16 | Stiffness & Toughness | mLLDPE Dow INNATE XUS 59910.03 (0.912 density) |
| 3 - interposed | 10 | Toughness | mLLDPE or LLDPE (e.g., Dow INNATE XUS 59910.03 at 0.912 density) blended with tie resin to bond to EVOH core |
| 4 - core | 5 (max) | Barrier | 100% EVOH (44 mol % ethylene content) |
| 5 - interposed | 10 | Toughness | mLLDPE or LLDPE (e.g., Dow INNATE XUS 59910.03 at 0.912 density) blended with tie resin to bond to EVOH core |
| 6 - interposed | 16 | Stiffness & Toughness | mLLDPE Dow INNATE XUS 59910.03 (0.912 density) |
| 7 - sealant | 21.5 | Sealing | 100% mLLDPE or LLDPE (e.g., Dow INNATE XUS 59910.03 at 0.912 density) |

TABLE 4

Overview of non-barrier inner ply

| Layer | % total (thickness) | Purpose | Composition |
|---|---|---|---|
| 1 - sealant | 15 | Sealing | 100% mLLDPE or LLDPE (e.g., Dow INNATE XUS 59910.03 at 0.912 density) |
| 2 - interposed | 20 | Stiffness & Toughness | mLLDPE Dow INNATE XUS 59910.03 (0.912 density) |
| 3 - core | 30 | Toughness | mLLDPE or LLDPE (e.g., Dow INNATE XUS 59910.03 at 0.912 density) |
| 4 - interposed | 20 | Stiffness & Toughness | mLLDPE Dow INNATE XUS 59910.03 (0.912 density) |
| 5 - sealant | 15 | Sealing | 100% mLLDPE or LLDPE (e.g., Dow INNATE XUS 59910.03 at 0.912 density) |

Reference Embodiment

Comparative example flexible bags are prepared having a two-ply structure, with the outer barrier ply having the following structure: 3.8-mil (96.5 micron) thick; symmetrical; coextruded; seven-layered film with an EVOH (32 mol % ethylene) layer as the barrier core layer of 2.5-5.0% thickness of the barrier film (approximately 3.0-4.8 micron in some measurements). The EVOH layer thus represents about 2.5-5.0% (e.g., 3.6 μm/96 μm) of the total outer-ply thickness.

The inner-ply of the comparative flexible bags comprises the following structure: 1.5-mil (38 micron) thick; coextruded; five-layered film without any EVOH in the core layer.

Given below are the results of the Bruceton Bag-Drop Test, where the target was to achieve a F50 (median) drop value of 4 ft.

TABLE 5

Bruceton Bag Drop Test

| Examples | Bruceton F50 Bag Drop Height, ft | |
|---|---|---|
| | Water Temp. 60° C. | Water Temp. 75° C. |
| Embodiment 1 | 4.4 | 4.4 |
| Reference Embodiment | 2.8 | 3.4 |

TABLE 5.1

Bruceton Bag Drop Test - Percent Performance Improvement

| Examples | Bruceton F50 Bag Drop Height, ft | |
|---|---|---|
| | Water Temp. 60° C. | Water Temp. 75° C. |
| Embodiment 1 | 57% | 29% |
| Reference Embodiment | 0% (baseline) | 0% (baseline) |

The flexible bags of Embodiment 1 surprisingly exhibits 57% and 29% improvement in its Bruceton Bag-Drop height over the comparative flexible bag, at 15° C., and at 24° C. In fact, the flexible bags of Embodiment 1 achieves the targeted 4-ft drop height.

Co-extruded films of the reference embodiment and embodiment 1 are compared to assess Flex-Crack Resistance and Stiffness of the outer (barrier) ply containing EVOH are shown and summarized in Tables 6-6.1.

TABLE 6

Gelbo Flex Testing (ASTM F-392) & 1% Secant Modulus (ASTM D-882)

| Examples | No. of Pinholes After 10,800 Flex Cycles | | 1% Secant Tensile Modulus, psi (1 psi = 6.89 KPa) | |
|---|---|---|---|---|
| | Machine Direction | Transverse Direction | Machine Direction | Transverse Direction |
| Embodiment 1 | 15 | 24 | 36,600 | 34,700 |
| Reference Embodiment | 23 | 31 | 41,900 | 41,000 |

TABLE 6.1

Percent improvement in Flex-Crack Resistance and Stiffness of the outer (barrier) ply

| Examples | % Improvement in No. of Pinholes after 10,800 Flex Cycles | | % Improvement in 1 % Secant Tensile Modulus, psi | |
|---|---|---|---|---|
| | Machine Direction | Transverse Direction | Machine Direction | Transverse Direction |
| Embodiment 1 | 35% | 22% | 12% | 15% |
| Reference Embodiment | 0% (Baseline) | 0% (Baseline) | 0% (Baseline) | 0% (Baseline) |

The above results show that the EVOH co-extruded films in accordance with the disclosure has good or improved Gelbo Flex-Crack resistance compared to the reference embodiment, which may be due in some part by lower tensile modulus, resulting in a more pliable, flexible film. For example, the film disclosed herein can exhibit improved flex-crack resistance (e.g., by about 35%) over the comparative (reference) co-extruded film, in the machine direction. Similarly, in the transverse direction, films in accordance with the disclosure can improve flex-crack resistance by about 22%. As it relates to the 1% Secant Modulus, the tensile modulus of films in accordance with the disclosure decreased by about 12% in the machine direction and 15% in the transverse direction compared to the reference embodiment film. These results are not expected as a primary difference in the two films arises from the introduction of a low amount (i.e., thin layer) of high-ethylene-content EVOH into the core layer of the co-extruded film. The EVOH structure and content aids in improving the barrier properties of the film while also making bags or other materials made from the film more amenable to recycling. The improvement in flex and secant modulus also translate into superior shipping performance when filled bags are loaded in a box, palletized, and shipped to end user locations.

Example 2. Flexible Bag Performance

In the embodiments below, the thickness of the outer and inner plies were varied to determine any effect on Bruceton Bag-Drop performance and the performance of the structure as an oxygen barriers. Oxygen barrier characteristic was tested using the MOCON under the ASTM D3985 protocol.

Embodiment 2

The outer-ply of the flexible bag in accordance with Embodiment 2 comprises the following structure: 3.8 mil (96.5 micron) thick; symmetrical; coextruded; seven-layered film with an EVOH (44 mol % ethylene) layer within the core layer, of 2.5-5.0% thickness of the barrier film (approximately 3.0-4.8 micron in some measurements). The EVOH layer thus represents about 2.5-5.0% (e.g., 3.4% (100×(3.3 μm/96 μm)) of the total outer thickness.

The inner-ply of the flexible bags comprises the following structure: 1.5 mil (38 micron) thick; coextruded without the EVOH in the core-layer. The EVOH layer thickness as a percent of the total thickness of the two plies can be approximated (e.g., 2.4% (100×(3.3 μm/(96 μm+38 μm)))).

Embodiment 3

In Embodiment 3, the outer-ply of the flexible bags comprises the following structure: 3.8 mil (96.5 micron)

thick; symmetrical; coextruded; seven-layered film with an EVOH (44 mol % ethylene) layer within the core layer, of 2.5-5.0% thickness of the barrier film (approximately 3.0-4.8 micron in some measurements). The EVOH layer thus represents about 2.5-5.0% (e.g., about 3.4% (100×(3.3 μm/96 μm)) of the total outer thickness.

The inner-ply of Embodiment 3 comprises the following structure: 45 micron thick; coextruded film structure without any EVOH core barrier layer. The EVOH layer thickness as a percent of the total thickness of the two plies can be approximated (e.g., 2.3% (100×(3.3 μm/(96 μm+45 μm)))).

Embodiment 4

The outer-ply in the flexible bags of Embodiment 4 comprises the following structure: 70 micron thick; symmetrical; coextruded; seven-layered with an EVOH (44 mol % ethylene) layer within the core layer, of 2.5-5.0% thickness of the barrier film (approximately 2.0-4.8 micron in some measurements). The EVOH layer thus represents about 2.5-5.0% (e.g., about 3.4% (100×(2.4 μm/70 μm)) of the total outer thickness.

The inner-ply of Embodiment 4 comprises the following structure: 70 micron thick; coextruded film structure without any EVOH core barrier layer. The EVOH layer thickness as a percent of the total thickness of the two plies can be approximated (e.g., 1.7% (100×(2.4 μm/(70 μm+70 μm)))).

Embodiment 5

The outer-ply in the flexible bags of Embodiment 5 comprises the following structure: 45 micron thick; symmetrical; coextruded; seven-layered film with an EVOH (44 mol % ethylene) layer within the core layer, of 2.5-5.0% thickness of the barrier film (approximately 1.5-4.8 micron in some measurements). The EVOH layer thus represents about 2.5-5.0% (e.g., about 3.5% (100×(1.6 μm/45 μm)) of the total outer thickness.

The inner-ply of Embodiment 5 comprises the following structure: 96 micron thick; coextruded film structure without any EVOH in the core-layer. The EVOH layer thickness as a percent of the total thickness of the two plies can be approximated (e.g., 1.1% (100×(1.6 μm/(45 μm+96 μm)))).

Embodiment 6 (Comparative/Reference)

The outer-ply in the flexible bags of Embodiment 6 comprises the following structure: 96 micron thick; symmetrical; coextruded; seven-layered film with an EVOH (32 mol % ethylene) layer within the core layer, of 2.5-5.0% thickness of the barrier film (approximately 3.0-4.8 micron in some measurements). The EVOH layer thus represents about 2.5-5.0% (e.g., about 3.4% (100×(3.3 μm/96 μm)) of the total outer ply thickness.

The inner-ply of the flexible bag constitutes the following structure: 38 micron thick; coextruded film structure without any EVOH core barrier layer. The EVOH layer thickness as a percent of the total thickness of the two plies can be approximated (e.g., 2.4% (100×(3.3 μm/(96 μm+38 μm)))).

Embodiment 7 (Comparative/Reference)

The outer-ply of the flexible bags of Embodiment 7 comprises the following structure: 96 micron thick; symmetrical; coextruded; seven-layered film with an EVOH (32 mol % ethylene) layer within the core layer, of 2.5-5.0% thickness of the barrier film (approximately 3.0-4.8 micron in some measurements). The EVOH layer thus represents about 2.5-5.0% (e.g., about 3.4% (100×(3.3 μm/96 μm)) of the total outer ply thickness.

The inner-ply of the flexible bag constitutes the following structure: 45 micron thick; coextruded film structure without any EVOH core barrier layer. The EVOH layer thickness as a percent of the total thickness of the two plies can be approximated (e.g., 2.3% (100×(3.3 μm/(96 μm+45 μm)))).

TABLE 7

Bruceton Bag-Drop and Oxygen Transmission Rate for Varying Outer-Ply and Inner-Ply Thicknesses

| Embodiment | Outer-Ply Thickness μm (mils) | Inner-Ply Thickness μm (mils) | EVOH Content % of Total Ply Thickness | F50 Bruceton Bag-Drop, ft | Range of Oxygen Transmission Rate (OTR) of Outer-Ply Only: $cm^3$/100 $in^2$/day at 23° C. & 60% RH |
|---|---|---|---|---|---|
| | | | Illustrative Examples | | |
| 2 | 96 (3.8) | 38 (1.5) | 2.4 | 4.3 | 0.4068; 0.4545 |
| 3 | 96 (3.8) | 45 (1.8) | 2.3 | 4.9 | 0.4068; 0.4545 |
| 4 | 70 (2.8) | 70 (2.8) | 1.7 | 4.0 | 0.559; 0.547 |
| 5 | 45 (1.8) | 96 (3.8) | 1.1 | 4.2 | 1.065; 1.058 |
| | | | Comparative Examples | | |
| 6 | 96 (3.8) | 38 (1.5) | 2.4 | 2.8 | 0.042; 0.050 |
| 7 | 96 (3.8) | 45 (1.8) | 2.3 | 2.6 | 0.042; 0.050 |

Example embodiments 3, 4, and 5 showed that varying the thickness of the outer and inner plies, while keeping the total thickness the same, maintained the desired height of the F50 bag-drop at 4.0 ft or higher. Reducing the inner non-barrier ply from 45 micron to 38 micron (embodiments 2 and 3) maintained the drop height above 4 ft. Reducing the outer barrier ply thickness and increasing the inner non-barrier ply thickness also reduces the overall amount of EVOH in the structure from 2.4% to 1.1% (excluding fitment). Therefore, depending on the maximum amount of EVOH allowed in the packaging for recyclability purposes, the overall amount of EVOH can be adjusted.

Comparative embodiments 6 and 7 showed inferior bag-drop heights below 4 ft. These two comparative embodiments comprises a higher-barrier EVOH grade (32 mol % ethylene grade) in the core layer, which finds some standard industry use. While the embodiments may exhibit better oxygen barrier performance than non-barrier films, bag drop performance is worsened likely due to the physical characteristics of the 32 mol % ethylene grades, which are typically brittle. Thus, the increase in oxygen barrier merely adds to manufacturing costs and surprisingly fails to provide resilience, recyclability, and oxygen barrier properties exhibited by the films and flexible bags of the example aspects and embodiments illustrated by the disclosure.

The oxygen barrier of a typical biax-nylon laminate—which is used in industry for typical beverage bags—is approximately 3.6 cm$^3$/100 in$^2$/day. This oxygen barrier data was generated for a 3.8-mil (96-μm) thick thermal laminate with a 0.48-mil (12 μm) thick biax-nylon 6 core-layer. The entire range of oxygen barrier values for the various embodiments in the Examples is shown to be better than the benchmark biax-nylon value. Consequently, using the films in accordance with the example embodiments described herein to produce flexible bags can maintain the shelf life without the need for higher EVOH barrier properties (lower OTR values). This also provides for reduction in costs.

Example 3. Comparison of Films and Bags to Standard Biax-Nylon

Two-ply five gallon bags are produced from films having the following structure: an outer ply (1.8, 2.8, and 3.8 mil thick) having seven layers with an EVOH core (44 mol % ethylene) coextrusion having a 5% maximum thickness in the ply; and an inner ply (3.8, 2.8, and 1.8 mil thick) having five layers of a coextrusion containing no EVOH/barrier layer.

The five gallon bags had an outside width of 18.75", and an outside length of 24.75" produced on a Maverick bag line.

For comparison, a two-ply standard biax-nylon bag was produced using the following ply structures: an outer ply having 3.8 mil biax-nylon laminate; and an inner ply having 1.8 mil LLDPE.

The bags are evaluated using a drop test, where ten bags of each bag type were dropped from a height of 30 inches. The bags were filled with water on a Liqui-Box 1500 filler and stored for 16 hours at constant temperatures (73° F., ambient; and 40° F., cold) prior to testing. The total bag weight was about 43 lbs.

Each bag was dropped three times, with the first drop orienting the bag flat, with the fitment facing up, the second drop on the bottom cross-seal of the bag, and the third drop on the long seal of the bag.

TABLE 8

Drop test performance

| Bag | Outer ply thickness, mils | Inner ply thickness, mils | Ambient (73° F.) | Cold (40° F.) |
|---|---|---|---|---|
| Ex. 3-1 | 3.8 | 1.8 | No bags failed | Five bags failed |
| Ex. 3-2 | 2.8 | 2.8 | One bag failed | Two bags failed |
| Ex. 3-3 | 1.8 | 3.8 | One bag failed | No bags failed |
| nylon | 3.8 | 1.8 | Two bags failed | Four bags failed |

This drop data demonstrates that the bags produced in accordance with the example embodiments of the disclosure are at least as resilient as bags produced with standard biax-nylon material, across a standard temperature range (ambient and cold temperatures) and with differing thicknesses of the barrier and non-barrier plys. This improved resiliency for such bag materials are unexpected and provide for at least one or more of the following features:

(a) reduce and/or limit the amount of EVOH in the core layer of the barrier ply to a maximum 5% of the total film thickness, which is markedly different from most EVOH-containing film structures which typically include amounts of EVOH in core layer from between 5% and 12%, and allow for greater down-stream sustainability and recyclability;

(b) include a low-oxygen barrier grade of EVOH, e.g. greater than about 30 mol % and up to about 48 mol % (e.g., 44 mol %) ethylene content, which is markedly different from typical EVOH blown film structures which use 29 mol % or 32 mol % ethylene content, and provide for improved oxygen barrier properties;

(c) film structures that allow for simple adjustment of thickness of the EVOH barrier layer in the outer barrier ply, as well as the thickness of the inner non-barrier ply to reduce the overall level of EVOH in the bag if desired or preferred, thus lowering the total amount of EVOH in the overall bag structure (excluding fitment) to about 2.5% and to as little as 1.1% of the thickness of the total ply structure.

(d) films provide improved performance and recyclability relative to other films and bag structures that employ materials such as nylon, PET, or metal (e.g., vacuum deposited coating or aluminum foil).

Accordingly, the embodiments disclosed herein provide lower-oxygen barrier films and bags for end-use applications (e.g., for bag-in-box) for products that have a shelf life of about six months or less including, for example, beverage and beverage-related additives (e.g., syrups), edible oils, dairy products and the like. In such embodiments use of the films for high barrier bag-in-box for long shelf-life aseptic or hot-fill packaging is typically avoided.

We claim:

1. A co-extruded multi-layer polymeric recyclable barrier film comprising five layers, comprising:
   (i) an inner sealant layer comprising an ethylene/α-olefin copolymer fraction having a density in the range of 0.894 to 0.920 g/cm$^3$ in an amount of at least about 50% by weight or thickness of the total inner sealant layer, wherein the inner sealant layer has a total density in the range of from about 0.910 to 0.924 g/cm$^3$;
   (ii) a first and a second interposed layer comprising an ethylene/α-olefin copolymer fraction having a density in the range of 0.894 to 0.920 g/cm$^3$ in an amount of at least about 50% by weight or thickness of the first interposed layer, and an adhesive or tie resin in an amount effective to improve adhesion of the first and the second interposed layer to at least one other layers in the co-extruded multi-layer polymeric recyclable barrier film, wherein the first and the second interposed layer has a total density in the range of from about 0.910 to 0.924 g/cm$^3$;
   (iii) a core barrier layer comprising ethylene-vinyl alcohol (EVOH) copolymer comprising about 0.1% to about 10% by total weight or thickness of the co-extruded multi-layer polymeric recyclable barrier film, wherein the EVOH comprises at least 38% ethylene in the EVOH copolymer; and
   (iv) an outer sealant layer comprising an ethylene/α-olefin copolymer fraction having a density in the range of 0.894 to 0.920 g/cm$^3$ in an amount of at least about 50% by weight or thickness of the total outer sealant layer, wherein the outer sealant layer has a total density in the range of from about 0.910 to 0.924 g/cm$^3$.

2. The co-extruded multi-layer polymeric recyclable barrier film of claim 1, wherein the ethylene/α-olefin interpolymer comprises at least one metallocene linear low density polyethylene (mLLDPE) having a density of 0.912 g/cm$^3$.

3. The co-extruded multi-layer polymeric recyclable barrier film of claim 1, wherein the percent weight or thickness of the EVOH layer relative to the entire film is selected from the following numbers: 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, and 5.0.

4. The co-extruded multi-layer polymeric recyclable barrier film of claim 1, wherein the mole percent of ethylene in said EVOH copolymer is selected from the following numbers: 38, 39, 40, 41, 42, 43, 44, 45, 46, 47, 48, 49, 50, 51, 52, 53, 54, and 55.

5. The co-extruded multi-layer polymeric recyclable barrier film of claim 1 wherein the ethylene/α-olefin interpolymer in at least one of the inner sealant layer, the outer sealant layer, the first interposed layer, or the second interposed layer has a melt index in the range of 0.2 to 2.0 dg/min.

6. The co-extruded multi-layer polymeric recyclable barrier film of claim 1 wherein the ethylene/α-olefin interpolymer in at least one of the inner sealant layer, the outer sealant layer, the first interposed layer, or the second interposed layer has a zero shear viscosity ratio (ZSVR) in the range of 1.15 to 2.5.

7. The co-extruded multi-layer polymeric recyclable barrier film of claim 1 wherein the ethylene/α-olefin interpolymer in at least one of the inner sealant layer, the outer sealant layer, the first interposed layer, or the second interposed layer has a molecular weight distribution, expressed as the ratio of the weight average molecular weight to number average molecular weight (Mw/Mn) in the range of 2.0-4.0.

8. The co-extruded multi-layer polymeric recyclable barrier film of claim 1, wherein the total thickness the film is from about 1 mil to about 5 mils.

9. The co-extruded multi-layer polymeric recyclable barrier film of claim 1 wherein the ethylene/α-olefin interpolymer in at least one of the inner sealant layer, the outer sealant layer, the first interposed layer, or the second interposed layer comprises a polymer fraction of linear low density polyethylene and a second copolymer fraction of an ethylene/octene-1 copolymer, an ethylene/hexene-1 copolymer, or an ethylene/butene-1 copolymer.

10. The co-extruded multi-layer polymeric recyclable barrier film of claim 9, wherein the interpolymer has a density of 0.915 g/cm$^3$ and a melt index of 0.80-1.0 dg/min.

11. A co-extruded multi-layer polymeric recyclable barrier film comprising seven layers, comprising:
(i) an inner sealant layer comprising an ethylene/α-olefin copolymer fraction having a density in the range of 0.894 to 0.920 g/cm$^3$ in an amount of at least about 50% by weight or thickness of the total inner sealant layer, wherein the inner sealant layer has a total density in the range of from about 0.910 to 0.924 g/cm$^3$;
(ii) a first and a second outer interposed layer, and a first and a second inner interposed layer, wherein all the interposed layers comprise an ethylene/α-olefin copolymer fraction having a density in the range of 0.894 to 0.920 g/cm$^3$ in an amount of at least about 50% by weight or thickness of the first interposed layer, wherein all the interposed layers have a total density in the range of from about 0.910 to 0.924 g/cm$^3$, and wherein the first and second inner interposed layers comprise an adhesive or tie resin in an amount effective to improve adhesion of the first and the second inner interposed layer to at least one layer in the co-extruded multi-layer polymeric film;
(iii) a core barrier layer adjacent to and located between the first and the second inner interposed layers, the core barrier layer comprising ethylene-vinyl alcohol (EVOH) copolymer comprising about 0.1% to about 10% by total weight or thickness of the co-extruded multi-layer polymeric film, wherein the EVOH comprises at least 38% ethylene in the EVOH copolymer; and
(iv) an outer sealant layer comprising an ethylene/α-olefin copolymer fraction having a density in the range of 0.894 to 0.920 g/cm$^3$ in an amount of at least about 50% by weight or thickness of the total outer sealant layer, wherein the outer sealant layer has a total density in the range of from about 0.910 to 0.924 g/cm$^3$.

12. The co-extruded multi-layer polymeric recyclable barrier film of claim 11, wherein the ethylene/α-olefin interpolymer comprises at least one metallocene linear low density polyethylene (mLLDPE) having a density of 0.912 g/cm$^3$.

13. The co-extruded multi-layer polymeric recyclable barrier film of claim 11, wherein the percent weight or thickness of the EVOH layer relative to the entire film is selected from the following numbers: 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, and 5.0.

14. The co-extruded multi-layer polymeric recyclable barrier film of claim 11, wherein the mole percent of ethylene in said EVOH copolymer is selected from the following numbers: 38, 39, 40, 41, 42, 43, 44, 45, 46, 47, 48, 49, 50, 51, 52, 53, 54, and 55.

15. The co-extruded multi-layer polymeric recyclable barrier film of claim 11 wherein the ethylene/α-olefin interpolymer in at least one of the inner sealant layer, the outer sealant layer, the first and second inner interposed layer, or the first and second outer interposed layer has a melt index in the range of 0.2 to 2.0 dg/min.

16. The co-extruded multi-layer polymeric recyclable barrier film of claim 11 wherein the ethylene/α-olefin interpolymer in at least one of the inner sealant layer, the outer sealant layer, the first and second inner interposed layer, or the first and second outer interposed layer has a zero shear viscosity ratio (ZSVR) in the range of 1.15 to 2.5.

17. The co-extruded multi-layer polymeric recyclable barrier film of claim 11 wherein the ethylene/α-olefin interpolymer in at least one of the inner sealant layer, the outer sealant layer, the first and second inner interposed layer, or the first and second outer interposed layer has a molecular weight distribution, expressed as the ratio of the weight average molecular weight to number average molecular weight (Mw/Mn) in the range of 2.0-4.0.

18. The co-extruded multi-layer polymeric recyclable barrier film of claim 11, wherein the total thickness the film is from about 1 mil to about 5 mils.

19. The co-extruded multi-layer polymeric recyclable barrier film of claim 11 wherein the ethylene/α-olefin interpolymer in at least one of the inner sealant layer, the outer sealant layer, the first or second outer interposed layer, or the first or the second inner interposed layer comprises a polymer fraction of linear low density polyethylene and a second copolymer fraction of an ethylene/octene-1 copolymer, an ethylene/hexene-1 copolymer, or an ethylene/butene-1 copolymer.

20. The co-extruded multi-layer polymeric recyclable barrier film of claim 19, wherein the interpolymer has a density of 0.915 g/cm$^3$ and a melt index of 0.80-1.0 dg/min.

\* \* \* \* \*